US012717342B2

(12) United States Patent
Frick et al.

(10) Patent No.: US 12,717,342 B2
(45) Date of Patent: Aug. 25, 2026

(54) AUTONOMOUS WORK VEHICLE USING IMAGE-BASED LOCALIZATION

(71) Applicant: THE TORO COMPANY, Bloomington, MN (US)

(72) Inventors: Alexander Steven Frick, Farmington, MN (US); David Arthur LaRose, Pittsburgh, PA (US); Stephen Paul Elizondo Landers, Pittsburgh, PA (US); Eckhard Schwendemann, Bühl (DE)

(73) Assignee: THE TORO COMPANY, Bloomington, MN (US)

( * ) Notice: Subject to any disclaimer, the term of this patent is extended or adjusted under 35 U.S.C. 154(b) by 137 days.

(21) Appl. No.: 18/564,173

(22) PCT Filed: Jun. 17, 2022

(86) PCT No.: PCT/US2022/033930

§ 371 (c)(1),
(2) Date: Nov. 27, 2023

(87) PCT Pub. No.: WO2022/266411

PCT Pub. Date: Dec. 22, 2022

(65) Prior Publication Data

US 2024/0248484 A1 Jul. 25, 2024

Related U.S. Application Data

(60) Provisional application No. 63/211,924, filed on Jun. 17, 2021.

(51) Int. Cl.
*G05D 1/246* (2024.01)
*A01D 34/00* (2006.01)
(Continued)

(52) U.S. Cl.
CPC ......... *G05D 1/2462* (2024.01); *A01D 34/008* (2013.01); *G05D 1/648* (2024.01);
(Continued)

(58) Field of Classification Search
CPC .... G05D 1/0272; G05D 1/0246; G05D 1/024; G05D 1/0242; G05D 1/0248;
(Continued)

(56) References Cited

U.S. PATENT DOCUMENTS

2004/0016077 A1 1/2004 Song et al.
2005/0182518 A1* 8/2005 Karlsson ................ G06V 10/84 700/253

(Continued)

FOREIGN PATENT DOCUMENTS

CN 106679647 A 5/2017
CN 111274343 A 6/2020

(Continued)

OTHER PUBLICATIONS

International Preliminary Report on Patentability of the International Preliminary Examining Authority issued Jul. 27, 2023, International Patent Application No. PCT/US2022/033930, filed Jun. 17, 2022; 17 pages.

(Continued)

*Primary Examiner* — Nga X Nguyen
(74) *Attorney, Agent, or Firm* — Mueting Raasch Group

(57) ABSTRACT

An autonomous work vehicle generates a localization image of a part of a scene surrounding the autonomous work vehicle and generates a check image of a different part of the scene. A controller of the vehicle performs a localization process that involves generating the localization image and the check image. The localization image is used to determine an estimated pose of the autonomous work vehicle within the work region via a stored 3D point cloud (3DPC). The (Continued)

estimated pose and the 3DPC are used to determine predicted features within the check image. A comparison between the predicted features and corresponding features in the check image validates the estimated pose based on the comparison satisfying a threshold.

18 Claims, 15 Drawing Sheets

(51) Int. Cl.

*A01D 101/00* (2006.01)
*G05D 1/648* (2024.01)
*G05D 105/15* (2024.01)
*G05D 111/10* (2024.01)
*G06T 7/73* (2017.01)

(52) U.S. Cl.

CPC ........... *G06T 7/73* (2017.01); *A01D 2101/00* (2013.01); *G05D 2105/15* (2024.01); *G05D 2111/10* (2024.01); *G06T 2207/10028* (2013.01)

(58) Field of Classification Search

CPC .. G05D 1/0255; G05D 1/0274; G05D 1/2462; G05D 1/648; G05D 2105/15; G05D 2111/10; G05D 1/2435; G05D 1/2469; G05D 1/6484; G05D 2107/23; G05D 2109/10; G06V 10/84; G06V 20/10; G06V 10/245; G06F 18/29; A01D 34/008; A01D 2101/00; A01D 34/67; G06T 7/73; G06T 2207/10028; G01C 21/20; G01C 21/005

See application file for complete search history.

(56) References Cited

U.S. PATENT DOCUMENTS

2014/0058634 A1* 2/2014 Wong ..................... G01S 17/08 701/50
2016/0150933 A1 6/2016 Duenne et al.
2017/0329347 A1 11/2017 Passot et al.
2018/0005407 A1 1/2018 Browning et al.
2018/0319392 A1* 11/2018 Posselius .............. G01S 13/931
2019/0329407 A1* 10/2019 Qi ........................ G05D 1/0248
2020/0356096 A1 11/2020 Leeb
2020/0394813 A1* 12/2020 Theverapperuma ......................... G05D 1/0257
2021/0223789 A1 7/2021 Chen et al.
2022/0253063 A1* 8/2022 Frick .................... G05D 1/0274

FOREIGN PATENT DOCUMENTS

EP 3822730 A1 8/2013
WO WO 266411 A1 12/2022

OTHER PUBLICATIONS

Written Opinion of the International Preliminary Examining Authority issued Apr. 26, 2023 for International Application No. PCT/US2022/033930, filed Jun. 17, 2022; 13 pages.
International Search Report and Written Opinion issued Sep. 22, 2022 for International Patent Application No. PCT/US2022/033930, filed Jun. 17, 2022; 18 pages.
Extended European Search Report issued Jun. 27, 2025 for EP Patent Application No. 25177324.8, filed May 19, 2025; 10 pages.
Communication under Article 94(3) EPC Examination Report mailed issued Feb. 18, 2026 for EP Patent Application No. 251773248, filed May 19, 2025; 7 pages.
Communication Pursuant to Article 94(3) EPC Examination Report mailed Jun. 11, 2026 for European Patent Application No. 25177324.8, filed May 19, 2025; 8 pages.

* cited by examiner

| # | Feature Descriptor | X | Y | Z |
|---|---|---|---|---|
| 1 | FD1 | X1 | Y1 | Z1 |
| 2 | FD2 | X2 | Y2 | Z2 |
| 3 | FD3 | X3 | Y3 | Z3 |
| ... | FD... | X... | Y... | Z... |
| n | FDn | Xn | Yn | Zn |

| # | Feature Descriptor | X | Y |
|---|---|---|---|
| 1 | FD1 | x1 | y1 |
| 2 | FD2 | x2 | y2 |
| 3 | FD3 | x3 | y3 |
| ... | FD... | x... | y... |
| n | FDn | xn | yn |

AUTONOMOUS WORK VEHICLE USING IMAGE-BASED LOCALIZATION

The present application is the § 371 U.S. National Stage of International Application No. PCT/US2022/033930, filed Jun. 17, 2022, which claims priority to and/or the benefit of U.S. Provisional Patent Application No. 63/211,924, filed Jun. 17, 2021, the disclosures of which are incorporated herein by reference in their entireties.

SUMMARY

The present disclosure is directed to apparatuses and methods that facilitate image-based localization of an autonomous work vehicle. In one embodiment, an autonomous work vehicle has at least one sensor operable to generate a localization image of a part of a scene surrounding the autonomous work vehicle, and a check image of a different part of the scene. A controller of the vehicle coupled to the at least one sensor and has access to a stored three-dimensional point cloud (3DPC) that represents a work region of the autonomous work vehicle. The controller is operable to receive a signal to start an autonomous operation mode of the autonomous work vehicle within the work region. In response to the signal, the controller performs a localization process that involves: generating the localization image and the check image; using the localization image to determine an estimated pose of the autonomous work vehicle within the work region via the 3DPC; using the estimated pose and the 3DPC to determine predicted features within the check image; and performing a comparison between the predicted features and corresponding features in the check image, and validate the estimated pose based on the comparison satisfying a threshold.

In another embodiment, an autonomous work vehicle has at least one sensor operable to generate three or more different images of a scene surrounding the autonomous work vehicle. A controller is coupled to the at least one sensor and has access to a stored three-dimensional point cloud (3DPC) that represents a work region of the autonomous work vehicle. The controller is operable to: receive a signal to start an autonomous operation mode of the autonomous work vehicle within the work region; in response to the signal, perform a localization process comprising: generating the three or more different images of the scene; defining three or more different image combinations of the three or more different images; using each of the three or more image combinations to determine respective three or more estimated locations of the autonomous work vehicle within the work region via the 3DPC; and determining a validated location based on the three or more estimated locations being within a location threshold. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
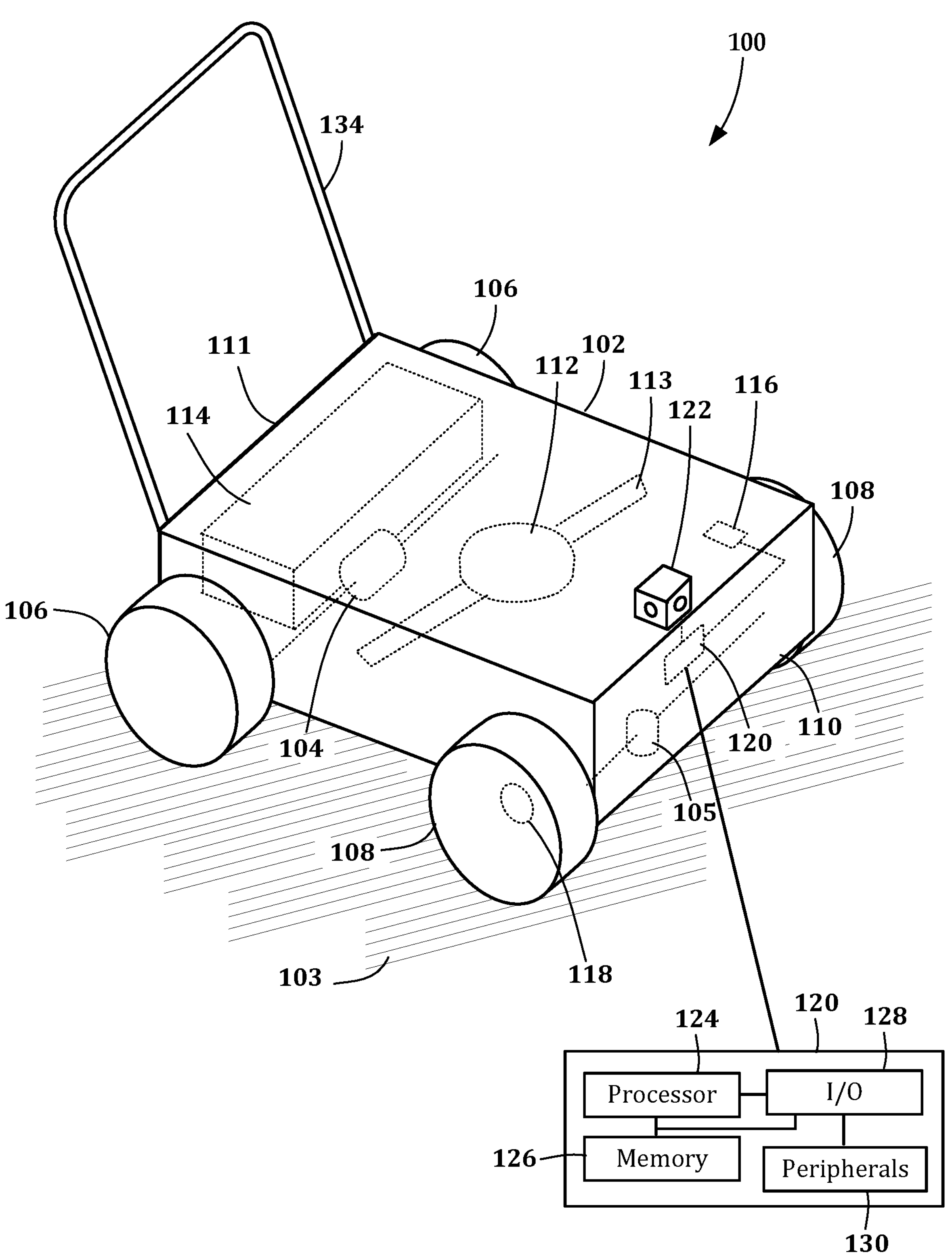
FIG. 1 is a diagram of an autonomous work vehicle according to an example embodiment.

In the following detailed description of illustrative embodiments, reference is made to the accompanying figures of the drawing which form a part hereof. It is to be understood that other equivalent embodiments, which may not be described and/or illustrated herein, are also contemplated.

The present disclosure relates to autonomous work vehicles. Generally, an autonomous work vehicle can traverse a work area with a work implement performing a repetitive and/or tedious task. Examples of such tasks include mowing, snow removal, dispersing solids or liquids (e.g., salt, fertilizer, seed, water, herbicides, pesticides), soil treatment (e.g., aeration), cleaning, applying markings or coatings, etc. The autonomous vehicle is self-powered (e.g., internal combustion engine, battery, fuel cell) and self-guiding. The self-guidance of the machine may still involve human inputs, such as first defining the task to be performed and then instructing the machine to perform the task.

Embodiments described herein relate to autonomous machine navigation methods and systems to autonomously navigate and operate within a boundary of a work region, such as for lawn mowing, snow clearing, surface treatment, animal control, security, etc. The autonomous machine may be configured in different modes to carry out various navigation functions, such as training mode, offline mode, and online mode. The autonomous machine may define one or more boundaries of a work region using a vision system and a non-vision-based sensor, for example, instead of using a boundary wire. The autonomous machine may correct a position and/or orientation within the work region. For example, the position and/or orientation (referred to collectively herein as the "pose") can determined or estimated using one or more non-vision-based sensors. A vision system can then collect data that is used to correct data to determine a more accurate pose. Training the autonomous machine may be performed during a training mode, which may include one or more phases, such as a touring phase and a mapping phase.

In FIG. 1, a simplified perspective view shows some features of an autonomous work vehicle 100 according to an example embodiment. The autonomous work vehicle 100 example is an autonomous lawn mower, however other autonomous work vehicles may have similar or analogous components that are similarly arranged. As shown in this view, the autonomous work vehicle 100 may include a housing 102 (e.g., frame or chassis with a shroud) that carries and/or encloses various components of the mower as described below. The autonomous work vehicle 100 may further include ground traversal members, such as wheels, rollers, or tracks. In the illustrated embodiment, ground traversal members shown includes one or more rear wheels 106 and one or more front wheels 108, that support and move the housing 102 upon a ground (e.g., grass) surface 103. As illustrated, the front wheels 108 are used to support a front end portion 110 of the housing 102 and the rear wheels 106 are used to support the rear end portion 111 of the housing.

One or both rear wheels 106 may be driven by a propulsion system (e.g., including one or more electric wheel motors 104) to propel the autonomous work vehicle 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. For example, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of autonomous work vehicle 100 direction, and/or could be driven by the propulsion system (i.e., to provide a front-wheel or all-wheel drive mower).

An implement (e.g., a grass cutting element, such as a blade 113) may be coupled to an implement motor 112 (e.g., cutting motor) carried by the housing 102. When the motors 112 and 104 are energized, the autonomous work vehicle 100 may be propelled over the ground surface 103 such that vegetation (e.g., grass) over which the mower passes is cut by the blade 113. While illustrated herein using only a single blade 113 and/or motor 112, mowers incorporating multiple blades, powered by single or multiple motors, are contemplated. Moreover, while described herein in the context of one or more conventional “blades,” other cutting elements may include, for example, disks, nylon string or line elements, knives, cutting reels, etc. Still further, embodiments combining various cutting elements, e.g., a rotary blade with an edge-mounted string trimmer, are also contemplated.

The autonomous work vehicle 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether. It is further noted that, while shown as using independent blade and wheel motors, such a configuration is illustrative only as embodiments wherein blade and wheel power is provided by a single motor are also contemplated.

The autonomous work vehicle 100 may further include one or more sensors 116 to provide location data. For instance, some embodiments may include a global positioning system (GPS) receiver (or other position sensor that may provide similar data) that is adapted to estimate a position of the autonomous work vehicle 100 within a work region and provide such information to a controller 120 (described below). In other embodiments, one or more of the wheels 106, 108 may include encoders 118 that provide wheel rotation/speed information that may be used to estimate mower position (e.g., based upon an initial start position) within a given work region. The sensors 116 may include a boundary wire detector, e.g., via ground penetrating radar, sonar, lidar, radio-frequency identification (RFID), etc. The boundary wire detector could be used in addition to other navigational techniques described herein.

The sensors 116 may include front obstacle detection sensors, rear obstacle detection sensors, side obstacle detection sensors, or other proximity detectors. The obstacle detection sensors may be used to detect an obstacle in the path of the autonomous work vehicle 100 when travelling in a forward or reverse direction, respectively. The autonomous work vehicle 100 may be capable of mowing while moving in either direction. Although not so illustrated, the obstacle detection sensors may be located at the front end portion 110 or rear end portion 111 of the autonomous work vehicle 100, respectively.

The obstacle detection sensors may use contact sensing, non-contact sensing, or both types of sensing. For example, both contact and non-contact sensing may be enabled concurrently or only one type of sensing may be used depending on the status of the autonomous work vehicle 100 (e.g., within a zone or travelling between zones). One example of contact sensing includes using a contact bumper protruding from the housing 102, or the housing itself, that can detect when the autonomous work vehicle 100 has contacted the obstacle. Non-contact sensors may use acoustic or light waves to detect the obstacle, sometimes at a distance from the autonomous work vehicle 100 before contact with the obstacle, e.g., using infrared, radio detection and ranging (radar), light detection and ranging (lidar), sound detection and ranging (sonar), etc.

The autonomous work vehicle 100 may include one or more vision-based sensors to provide localization data, such as position, orientation, or velocity. The vision-based sensors may include one or more cameras 122 that capture or record images for use with a vision system. The cameras 122 may be described as part of the vision system of the autonomous work vehicle 100. Types of images include, for example, training images and/or operational images.

The one or more cameras 122 may be capable of detecting visible light, non-visible light, or both. The one or more cameras 122 may establish a total field of view of at least 30 degrees, at least 45 degrees, at least 60 degrees, at least 90 degrees, at least 120 degrees, at least 180 degrees, at least 270 degrees, or even at least 360 degrees, around the autonomous machine (e.g., autonomous work vehicle 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

In some embodiments, the autonomous work vehicle 100 includes four cameras 122. The cameras 122 may each be facing a different direction, including a forward direction, a reverse direction, a first side direction, and a second side direction (e.g., cardinal directions relative to the autonomous work vehicle 100). One or more camera directions may be positioned orthogonal to one or more other cameras 122 or positioned opposite to at least one other camera 122. The cameras 122 may also be offset from any of these directions (e.g., at a 45 degree or another non-right angle). In some embodiments, fewer than four cameras 122 may be used to generate images from four different directions. For example, a single camera may rotate about a vertical axis to obtain four different images in the forward, reverse, and side directions.

The autonomous work vehicle 100 may be guided along a path, for example, in a manual manner using manual controls such as handle assembly 134. For example, manual direction of the autonomous work vehicle 100 may be used during a training mode to learn a work region or a boundary associated with the work region. The handle assembly 134 may extend outward and upward from a rear end portion 111 of the autonomous work vehicle 100. Other types of manual controls may be used for different vehicle configurations, e.g., steering wheels and pedals for ridable vehicles, wired or wireless controllers, etc.

The camera 122 positioned in a forward direction may have a pose that represents the pose of the autonomous machine. The pose may be a six-degree of freedom pose, which may include all position and orientation parameters for a three-dimensional space. In some embodiments, the position and orientation of the cameras may be defined relative to a geometric center of the autonomous work vehicle 100 or relative to one of the edges of the autonomous work vehicle 100.

Sensors of the autonomous work vehicle 100 may also be described as either vision-based sensors and non-vision-based sensors. Vision-based sensors may include cameras 122 that are capable of recording images. The images may be processed and used to build a 3D point cloud (3DPC) and/or used for optical odometry (e.g., optical encoding). Non-vision-based sensors may include any sensors that are not cameras 122. For example, a wheel encoder 118 that uses optical (e.g., photodiode), magnetic, and/or capacitive sensing to detect wheel revolutions may be described as a non-vision-based sensor that does not utilize a camera. Wheel encoding data from a wheel encoder may be also described as odometry data. In some embodiments, non-vision-based sensors do not include a boundary wire detector. In some embodiments, non-vision-based sensors receive signals from external systems, such as from a GPS satellite or other transceiver.

The autonomous work vehicle 100 may also include a controller 120 operable to monitor and control various mower functions. As seen in the block diagram at the bottom of FIG. 1, the controller 120 may include one or more processors 124 that receive various inputs and executes one or more computer programs or applications stored in memory 126. One or both of the processor 124 and memory 126 are coupled to input/output (I/O) circuitry 128. The I/O circuitry facilitates onboard communications between peripheral components 130, e.g., network adapters, user interfaces, sensors, etc. The I/O circuitry 130 may also facilitate communication with off-board devices such as motor controller, sensors, cameras 122, lights (not shown) etc. The off-board communication can use bus media and protocols such as controller area network (CAN), inter-integrated circuit (I2C), universal serial bus (USB), etc.

The memory 126 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 126 and the processor 124 could be contained in separate modules.

The processor 124 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 124 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 124 herein may be embodied as software, firmware, hardware, or any combination of these. Certain functionality of the controller 120 may also be performed in the cloud or other distributed computing systems operably connected to the processor 124.

The memory 126 may include computer-readable instructions or applications that, when executed, e.g., by the processor, cause the controller 120 to perform various calculations and/or issue commands. The processor 124 and memory 126 may together define a computing apparatus operable to process input data and generate the desired output to one or more components/devices.

The controller 120 may use the processor and memory in various different systems. In particular, one or more processors and memory may be included in each different system. In some embodiments, the controller 120 may at least partially define a vision system, which may include a processor and memory. The controller 120 may also at least partially define a navigation system, which may include a processors and memory separate from the processor and memory of the vision system.

Each system may also be described as having its own controller 120. For example, the vision system may be described as including one controller 120 and the navigation system may be described as having another controller 120. As such, the autonomous work vehicle 100 may be described as having multiple controllers 120. In general, as used herein, the term "controller" may be used to describe components of a "system" that provide commands to control various other components of the system.

Embodiments below relate to ensuring the reliability and accuracy of vision-based navigation. Generally, vision-based navigation involves autonomously moving an autonomous work vehicle around a predefined work area using vision-based sensors. This navigation may be augmented by other sensors, such as non-vision based sensors, and may involve other operations besides movement. For example, the navigation may control functions of the vehicle such as activating/deactivating the work implement, interrupting work and/or movement for recharging/refueling, and slowing or stopping due to potentially unsafe conditions.

Figure 2:
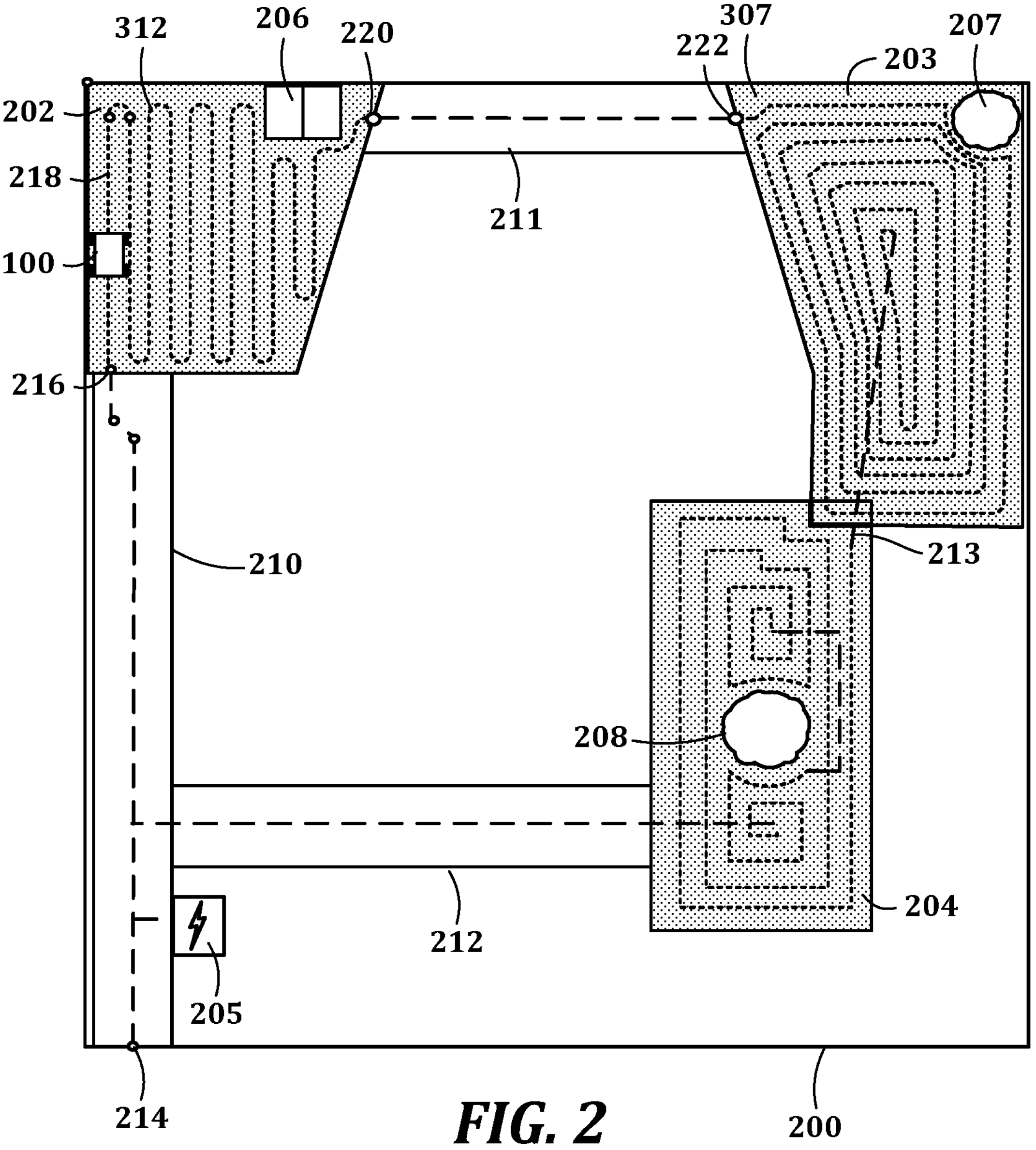
FIG. 2 is a diagram of a work region used by an autonomous work vehicle according to an example embodiment.

For purposes of the following discussion, various concepts of the work region 200 will be described, as shown in the diagram of FIG. 2. A boundary is defined, or determined, around the work region 200. In some embodiments, the autonomous work vehicle 100 may traverse random, semi-random, or planned paths to perform work in work zones 202-204 within the work region 200. The work zones 202-204 may represent an outdoor area or maintenance area, such as a lawn. The autonomous work vehicle 100 may travel through the work region 200 along a number of paths to sufficiently cover area in the work zones 202-204, e.g., to cut all the grass in each zone 202-204. The autonomous work vehicle 100 may recharge as needed, for example, when transitioning between zones 202-204. A recharging base, docking station, or base station 205 may be located within or along the work region 200.

Boundaries may be used to define the work region 200 and the various zones 202-204 within the work region 200. The boundary may be defined manually, or automatically, using a training mode of the autonomous work vehicle 100. In addition, some of the boundaries may also be defined using a fixed property boundary or other type of boundary. In some embodiments, the boundary may be defined by directing the autonomous work vehicle 100 along the work region 200, such as along a desired boundary path of the work region 200 in a training mode.

Other boundaries may be used to define an exclusion zone. An exclusion zone may represent an area of the work region 200 for the autonomous work vehicle 100 to avoid or travel around. For example, an exclusion zone may contain an obstacle 206-208 (such as a landscaped garden) or problem area (such as a steep slope). Other boundaries may be used to define transit zones 210-212, which may also be described as a transit path. These zones 210-212 may also be defined as paths irrespective of boundaries, as indicated by the dashed lines in the zones 210-212.

In general, a transit zone 210-212 or transit path is a zone or path connecting two other zones, such as transit zone 211 that connects work zones 202 and 203. A transit path 213 is also shown that connects work zones 203 and 204, but does not necessarily have a specified zone boundary. A transit zone may also be defined between a point in the work region and a "home" location or recharger (e.g., base station 205). A maintenance task may or may not be performed in the transit zones. For example, the autonomous work vehicle 100 may not mow grass in transit zone.

The work region 200 may be mapped with a terrain map. For example, the terrain map may be developed during a training mode of the mower, or during subsequent mowing operations. Regardless, the terrain map may contain information about the terrain of the work region 200, for example, elevation, grade, identified obstacles (e.g., permanent obstacles), identified stuck areas (e.g., areas the mower has gotten stuck whether due to grade or other traction conditions), or other information that may facilitate the ability of the autonomous work vehicle 100 to traverse the work region.

The resolution of points stored in the terrain map may be sufficient to provide useful elevation and/or grade information about the terrain in the work region 200 (e.g., on the order of feet or decimeters). For example, the resolution of points may correspond to spacing between points being less than or equal the width of the autonomous work vehicle 100. In some cases, different functions of path planning may use different levels of resolution. For example, path planning that maps work or exclusion zones may have the highest resolution (e.g., on the order of centimeters). In other words, the resolution of points proximate to, adjacent to, or near irregular boundaries or obstacles may have a finer granularity.

The autonomous work vehicle 100 may start coverage of the work region 200, e.g., starting at a boundary of the work region as indicated by point 214 or starting at the charger 205. The autonomous work vehicle 100 may determine a first zone 202. The zone 202 may be located adjacent to a boundary of the work region 200 or, as illustrated, may be located further within the work region 200. In other embodiments, the zone 202 may cover the entire work region 200. When the autonomous work vehicle 100 is finished mowing the zone 202, the mower may start another zone (e.g., zone 202, which may be dynamic or fixed) to continue mowing.

Figure 3:
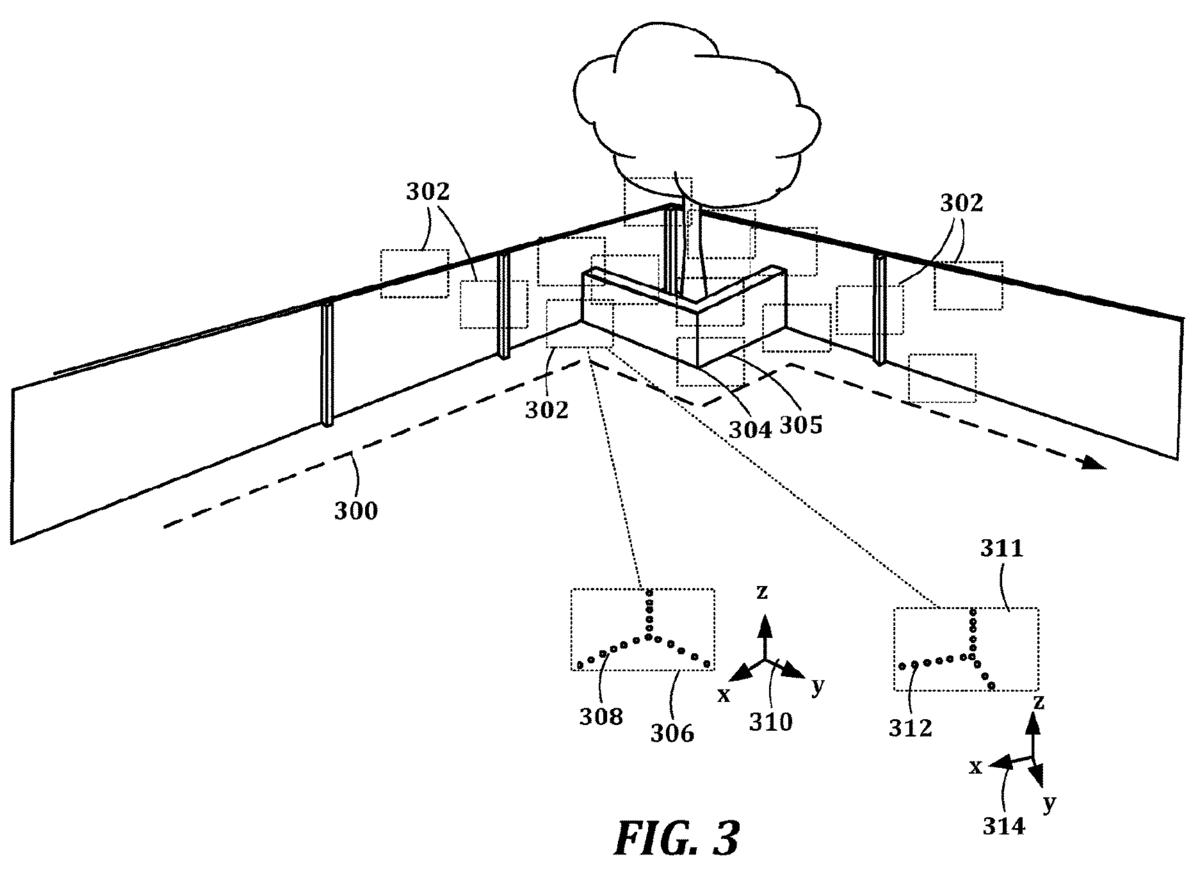
FIG. 3 is a perspective view showing image-based navigation concepts for an autonomous work vehicle according to an example embodiment.

In FIG. 3, a diagram illustrates image-based navigation concepts for an autonomous work vehicle according to an example embodiment. Data is recorded while the autonomous machine is directed along a path 300, e.g., on or near a boundary of a work region. Training images 302 from one or more cameras are recorded as image data (e.g., still image files such as JPG, PNG, video files such as MP4, etc.) while the autonomous machine is directed along the work region. Also, during training mode, non-vision-based data may also be recorded, such as GPS data, inertial measurement unit (IMU) data, and odometry data 508.

While the vision system records data, the navigation system of the autonomous work vehicle may observe and define boundaries for containment, exclusion, and transit zones. The boundaries may be stored in the navigation system for subsequent navigation during an online mode. An offline mode may be used subsequent to a training mode, which involves extracting and storing feature databased on results of the feature extraction or description algorithm.

As used herein, the term "feature" refers to two-dimensional (2D) data that result from identifying one or more points, such as key points or points of interest, in a two-dimensional image. For example, corner 304 and edge 305 of wall in FIG. 3 may be identified as features due contrasting colors, intensity, etc., along the geometric transitions. Features may be associated with objects that are any combination of permanent, temporary, natural, artificial, etc. Features may be two-dimensional, e.g., a painted pattern on a wall, although still associated with a three-dimensional location. Each unique feature may refer to one or more point of interest in an image or 3DPC The features may be stored as feature data containing coordinates defined relative to the image frame. In some embodiments, feature data may also include a descriptor applied to, associated with, or corresponding to the feature. The term "feature data" refers to a data structure that represents features and may include a position and a multi-dimensional descriptor (e.g., two-dimensional or three-dimensional).

As used herein, the term "descriptor" or "feature descriptor" refers to two-dimensional data that results from a descriptor algorithm. The descriptor describes the feature in the context of the image, and may at least characterize pixel values in a neighborhood of the feature. In some embodiments, a descriptor may describe pixel values, image gradients, scale-space information, or other data in the image near or around the feature. For example, the descriptor may include an orientation vector for the feature or may include a patch of image. A descriptor may be stored as part of feature data. The descriptor may also or instead include a compact representation of the descriptor, such as one or more hashes of the pixel values, image gradients, scale-space information.

Techniques described herein for feature detection, descriptors, feature matching, or visual map building may include or utilize algorithms, such as a Scale Invariant Feature Transform (SIFT), Speeded Up Robust Features (SURF), Oriented FAST and Rotated Brief (ORB), KAZE, Accelerated-KAZE (AKAZE), linear feature tracking, camera merging, loop closure, incremental structure from motion, or other suitable algorithms.

The autonomous work vehicle may utilize a feature matching algorithm to match features identified in different training images. Different images may have different lighting around the same physical key points, which may lead to some differences in the descriptors for the same features. Features having a similarity above a threshold may be determined to be the same feature. Examples of suitable algorithms include Brute-Force, Approximate Nearest Neighbor (ANN), and Fast Library for Approximate Nearest Neighbor (FLANN). The Brute-Force algorithm may match features by selecting one feature and checking all other features for a match.

The autonomous work vehicle may utilize a map building technique to create a 3DPC. Such techniques may include Structure from Motion (SfM) or Simultaneous Localization and Mapping (SLAM). As used herein, the term "three-dimensional point cloud," "3D point cloud," or "3DPC" includes a data structure that represents or contains three-dimensional geometric points which correspond to features extracted from images. In some embodiments, the geometric points and poses may be defined in a coordinate system based on an arbitrary frame of reference. In some embodiments, the 3DPC may or may not be associated with a scale, orientation, or both that is tied to the real-world, for example, until a map registration process has been performed. The 3DPC may be generated based on feature matching data. A graph, or visual map, may be generated based on the 3DPC to provide a human-viewable representation of the 3DPC.

In FIG. 3, a set of points 308 is shown that may represent features derived from an image of region bounded by rectangle 306 at a first pose, represented by coordinate system 310. A second set of points 312 is shown that may represent second features derived from region bounded by rectangle 311 at a second pose, represented by coordinate system 314. The feature data 308, 312 together with the pose data 310, 314 may be combined to build the 3DPC from visual data. The visual map building module may establish correspondences between 3D points and 2D features, even if the 2D-to-2D correspondences from the feature matching module have not been established. In other words, the visual map building module may not require that all features be matched before beginning the visual map building process.

Other data may be associated with the points of the 3DPC, such as images, descriptors, poses, position uncertainty, and pose uncertainty for one or more poses. The pose data, which may describe the position and/or orientation of the platform or some other component of the system at the times when the features associated with the 3DPC were observed. For example, positions and orientations of the autonomous machine during image recording may be determined based on the positions of various points in the 3DPC and positions of the corresponding features in the recorded images. Positions and orientations, or poses, may also be determined directly during generation of the point cloud. The position, orientation, or both types of data represented in the poses may be used for boundary determination or pose correction by the navigation system.

Optionally, non-vision-based data, such as GPS data, IMU data, and odometry data may also be used for map registration. As used herein, the term "registered map" refers to a 3DPC that has been tied to one or both of a real-world scale and real-world orientation, e.g., a real-world map or frame of reference. For example, a GPS may be used to tie the 3DPC to a real-world mapping service, such as GOOGLE MAPS™. In some embodiments, when using techniques described herein, the 3DPC may generally be scaled from about 0.5 times up to about 2 times when registered to a real-world map or frame of reference. However, scaling is generally not limited to these ranges. As used herein, the term "real-world" refers to the Earth or other existing frames of reference for a work region. A non-real-world frame of reference may be described as an arbitrary frame of reference.

Figure 4:
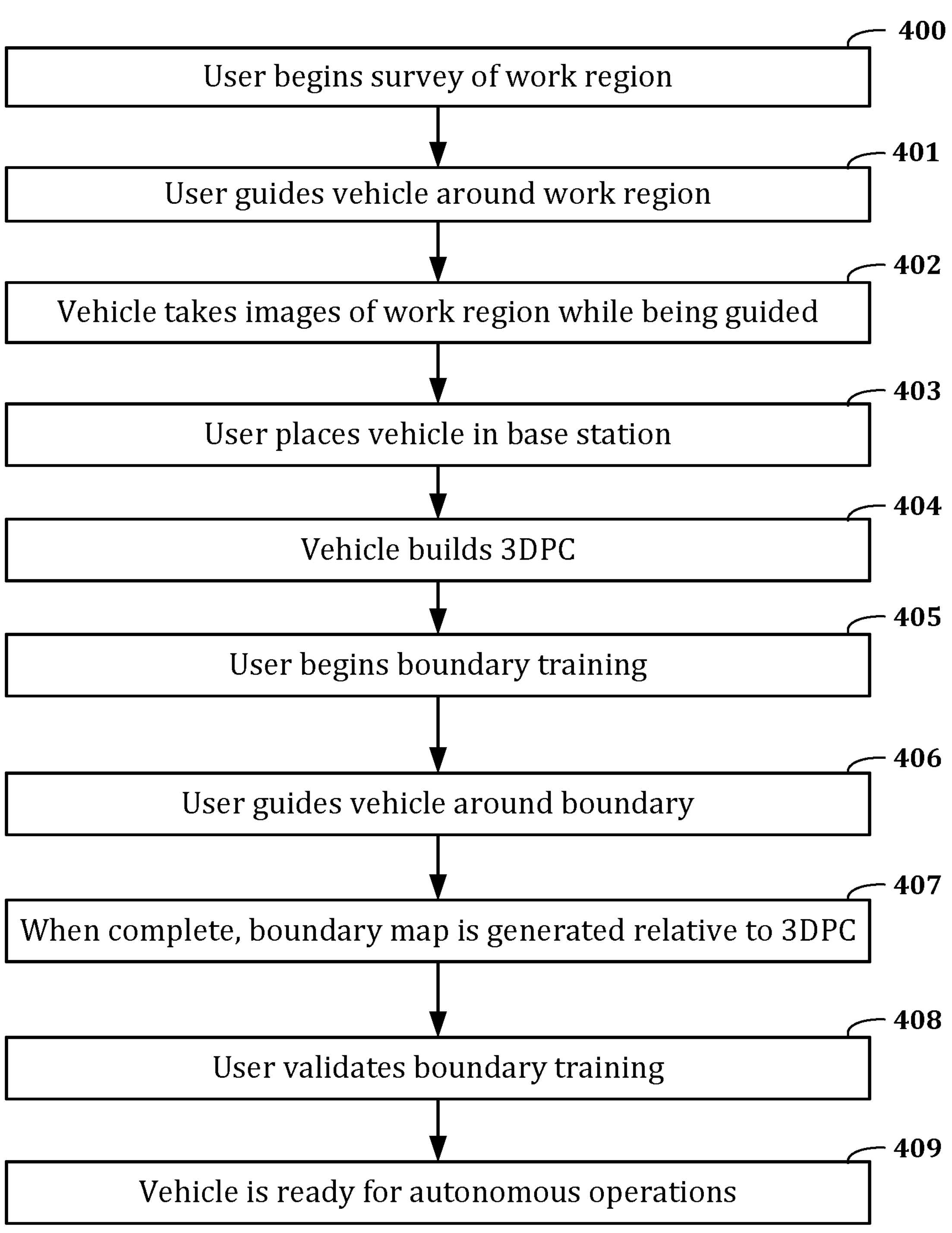
FIG. 4 is a flowchart illustrating vision-based navigation training of an autonomous work vehicle according to an example embodiment.

In FIG. 4, a flowchart illustrates example training workflow for an autonomous work vehicle according to an example embodiment. The user begins 400 a survey, e.g., by initializing an application on a mobile device, interacting directly with controls on the vehicle, etc. The user then guides 401 the vehicle around the work region, e.g., by pushing or riding the vehicle. The guiding 401 may involve performing work with the autonomous work vehicle. For example, if the autonomous work vehicle is set up for snow clearing, snow may need to be cleared anyway before the work region is traversed. Thus, the user can clear snow at the same time the vehicle is trained. Even so, the guiding 401 may not require full traversal of the work region, e.g., may just involve covering enough area that sufficient image data is gathered.

While being guided by the user, the autonomous work vehicle takes images 402 of the work region. These images may be from multiple cameras and may result in hundreds of images being taken and stored. This may also involve gathering and storing navigation data, e.g., IMU/odometry data, GPS data, etc. After the guiding phase is complete, the user may place 403 the vehicle in the base station, where the vehicle builds 404 the 3DPC. The building 404 is computationally intensive and time consuming, and so the user may return at some later time after the building 404 is complete.

After the 3DPC is built, the user may begin 405 boundary training, which can be initiated using a mobile device or user interface similar to the survey 400. The user guides 406 the vehicle around the boundary similar to the guiding at 401, except that just the boundaries are traversed. When the guiding 406 is complete, a boundary is generated 407 relative to the 3DPC. The user can then validate 408 the boundary training, e.g., by instructing the autonomous work vehicle to traverse the boundary and ensure it does so correctly. Assuming the validation 408 is successful, the vehicle is ready 409 for autonomous operation.

Figure 5:
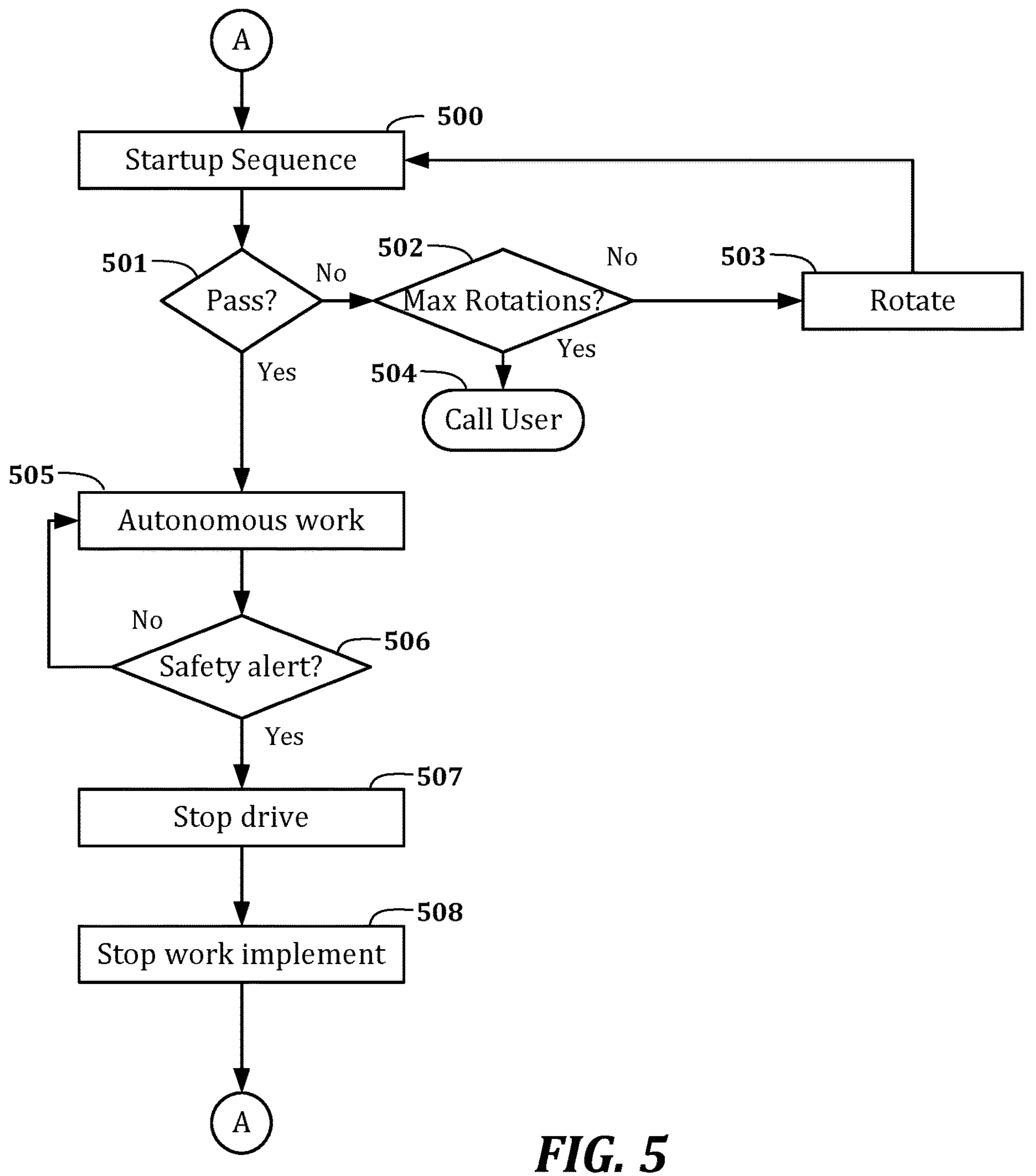
FIG. 5 is a flowchart illustrating a startup sequence of an autonomous work vehicle according to an example embodiment.

After the autonomous work vehicle is ready for autonomous operation, there are a number of cases where the mower is initialized in an unknown arbitrary pose within or outside the work region. Initialization in this context may refer to a transition from power-off to power-on state, transition from a power standby to active state, being manually located, fault recovery state, starting at or near the docking station, etc. In FIG. 5, a flowchart shows an example of autonomous work vehicle operation from a startup state.

A startup sequence 500 is performed whenever the autonomous work vehicle is initialized, e.g., in its docking station, being moved and started by the user to a work region, after fault recovery. The startup sequence 500 in this example is used to determine position/pose of the vehicle to ensure safe operation. The startup sequence 500 may check other conditions that might impact safety, e.g., movement of the work implement, collision detection, vehicle stability, battery temperature, etc., however those conditions are not considered here.

At block 501, it is determined whether the startup sequence passed, e.g., whether the autonomous work vehicle can determine its pose within some confidence value and/or error threshold. The specific operations used to determine the pose will be described in greater detail below, but generally involve an image-based pose determination from multiple camera images. If the startup sequence did not pass (block 501 returns 'no'), then the vehicle rotates 503 by some amount (e.g., 5 degrees, 10 degrees, etc.) and then repeats the startup sequence 500. Block 502 checks to make sure the rotations don't exceed some value. If so (block 502 returns 'yes'), then the user is called 504 and the vehicle is placed in an idle state, e.g., a fault condition state.

If the startup sequence passed (block 501 returns 'yes'), then the autonomous work vehicle can begin autonomous work 505. During this work 505, safety checks 506 are continuously made, such as determining the vehicle's location in the workspace within a confidence and/or error threshold. If an alert condition is determined (block 506 returns 'yes'), then the vehicle and work implement are stopped 507, 508 and the startup sequence 500 is performed in an attempt to reacquire the current pose.

Generally, the startup sequence 500 takes the input of two or more different sensors that provide independent localization data. This independence between the sensor localization data ensures that an error or misconfiguration of one of the sensors would be caught by at least one of the other sensors based on whether the independent localization data (location and bearing/attitude) agree within a threshold amount. If two sensors are used, then a disagreement in the data sources would result in an error condition (e.g., block 501 returns 'no') and would not allow operations. If more than two sensors are used, then it may be possible to discard erroneous readings so long as at the estimated poses of least two independent sources of data are separated by less than a threshold value.

Figure 6:
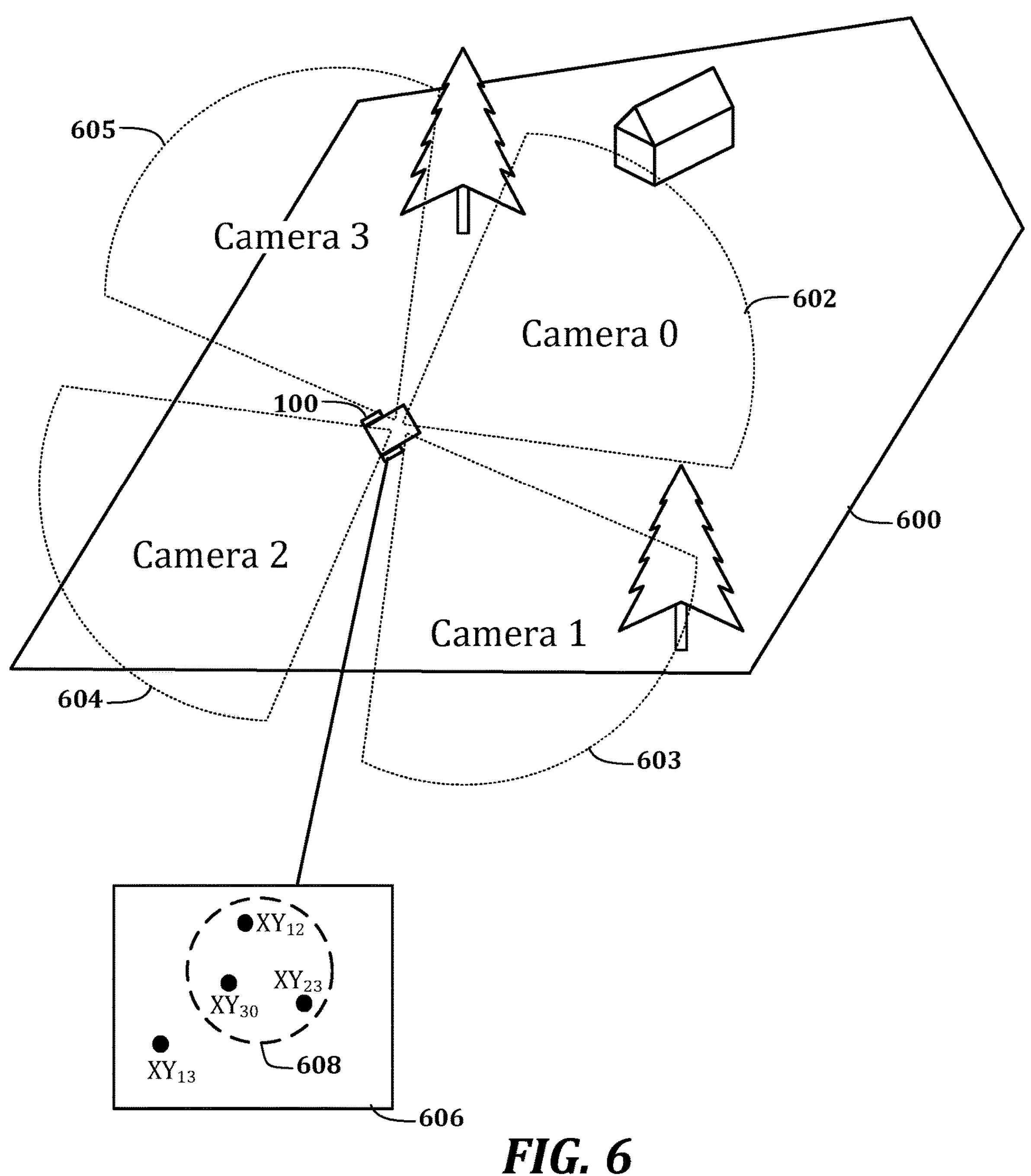
FIG. 6 is a plan view of a work region showing details a startup sequence of an autonomous work vehicle according to an example embodiment.

In FIG. 6, a diagram illustrates details of a startup sequence for pose determination according to an example embodiment. An autonomous work vehicle 100 is shown in an arbitrary location within a work region 600. It is assumed the vehicle 100 has previously been trained in this work region 600, and therefore stores or otherwise has access to a 3DPC and associated image data of the work region 600. Four fields of view 602-605 are shown for four cameras, here designated as cameras 0-3. During the check, multiple pose estimation sequences are performed, each sequence using a different camera pair. Assuming all four cameras are operational and have a clear view, then there are six possible combinations, as shown in Table 1 below. If one of the cameras is unusable (e.g., blocked), then a subset of these pairings could be used.

TABLE 1

| Pair | First Camera | Second Camera |
|---|---|---|
| $XY_{01}$ | 0 | 1 |
| $XY_{12}$ | 1 | 2 |
| $XY_{23}$ | 2 | 3 |
| $XY_{30}$ | 3 | 0 |
| $XY_{02}$ | 0 | 2 |
| $XY_{13}$ | 1 | 3 |

Each camera pair/combination is used to estimate the pose of the vehicle 100, and in one embodiment localization is confirmed if one pair/combination of cameras localize within a threshold. In other embodiments, localization is confirmed if more than half of the pairs localize within a threshold. Therefore, in this latter case, if all six camera pairs are used, then four camera pairs need to localize within the threshold in order to pass the startup sequence. A camera pair localizes within the threshold if a first pose estimate of a first camera of the pair agrees (within the threshold) with a second pose estimate of a second camera of the pair. The following is an example of the number of pairs in agreement if less than six camera pairs are used: 3 of 5; 3 of 4; 2 of 3; and 2 of 2. The detail block 606 of FIG. 6 shows an example of four camera pairs being used. Three of them are within a localization threshold 608, therefore this situation would pass the startup sequence. Note that this scenario does not mean that any of the cameras are malfunctioning. For example, all four of the cameras are used in at least one of the pairs in the detail block 606 even though all six pairs aren't being used. In some cases, the views 602-605 may need to satisfy some criteria, e.g., overlap less than a threshold, such that a pair of views can't be used together even if each view could be used with another, different view.

In some embodiments, the autonomous work vehicle 100 may perform the startup sequence in a charging dock, and this may block one of the cameras (e.g., forward camera 0). If so, this still leaves three cameras with four pairs, and so the autonomous work vehicle 100 can localize so long as three of the pairs localize within the threshold. If a second camera is blocked in such a situation, e.g., a temporary blockage, then there is only one pair of cameras available for localizing, and this would typically cause an error condition, e.g., such that the user is notified. In some embodiments, the docking station could be considered a pre-verified pose that is certified by the user, such that if the one camera can estimate a pose that agrees with the pre-verified pose within the threshold, then the startup procedure may be considered successful. The autonomous vehicle may determine it is in the docking station if voltage is detected at the charging power terminals, although other electrical terminals could be used as well in case the docking station is currently not powered.

Figure 7:
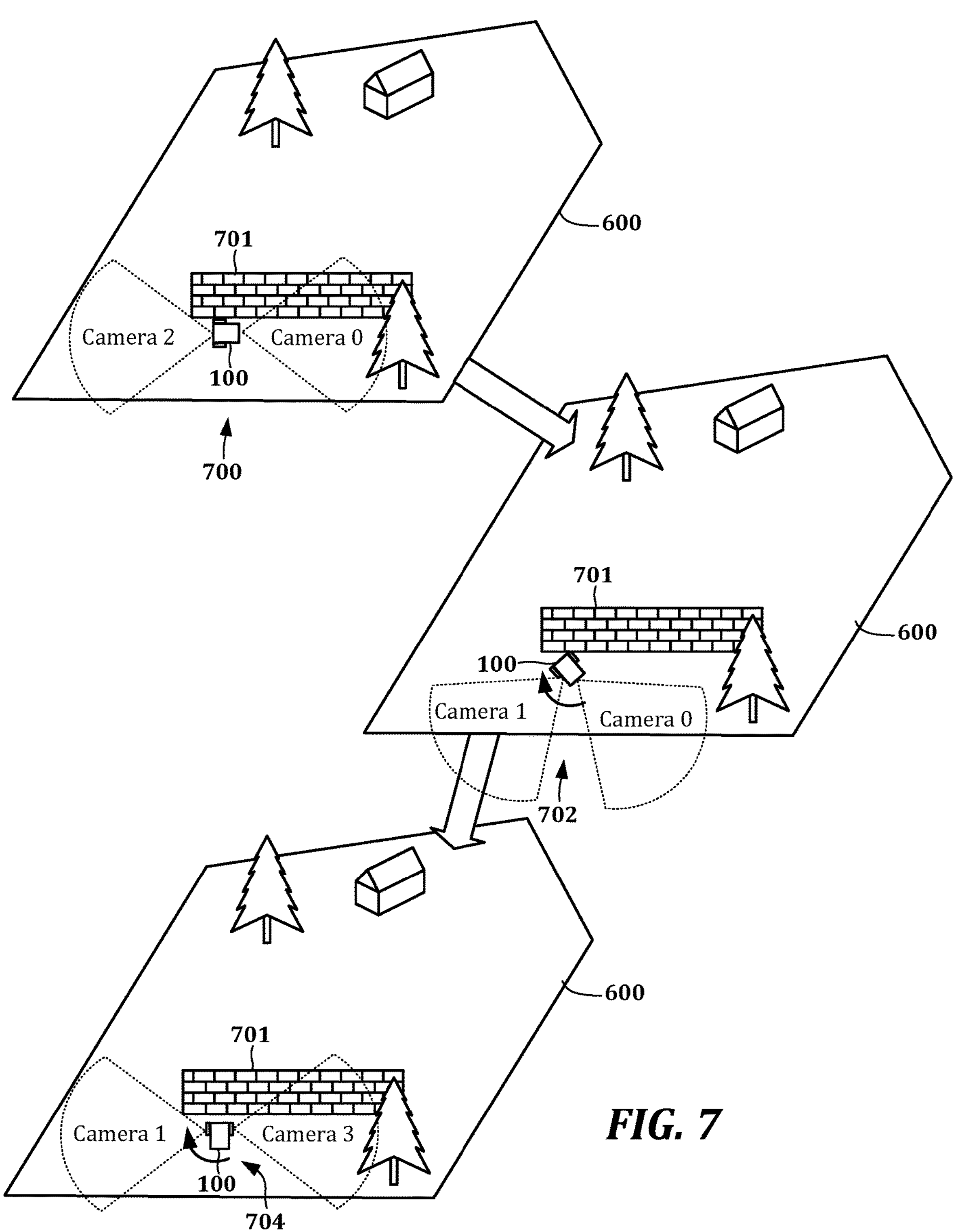
FIG. 7 is a plan view of a work region showing how an autonomous work vehicle may recover from a partial loss of vision navigation ability according to an example embodiment.

A similar situation may arise when the autonomous work vehicle is currently traversing a work route. Due to temporary or permanent objects that obstruct more than one camera, there may be cases where only one pair of cameras can be used to determine location of the vehicle. This situation may be considered an initialization event (or re-initialization) such that the autonomous work vehicle may make changes to navigation processing in order to revalidate pose. In FIG. 7 a diagram illustrates how an autonomous work vehicle 100 may recover from a partial loss of vision navigation ability in more than one camera according to an example embodiment.

As seen in the top of FIG. 7, the vehicle 100 is in a first pose 700 when it passes close to a wall 701, and in this location can only use two cameras for localization, namely cameras 0 and 2. As seen in the middle part of the figure, the vehicle 100 has rotated to a new, second pose 702, which is at the same location as the previous pose 700 but a different rotation relative to the work region 600. In the second pose 702, the vehicle 100 attempts a localization at the new rotation, this time with cameras 0 and 1. Note that the vehicle can generally make a determination as the best cameras to use in each pose, and the cameras used need not change after each rotation. The vehicle 100 may also employ more cameras in the second pose 702 than in the first pose 700, if conditions permit.

At the bottom of FIG. 7, the autonomous work vehicle 100 has rotated to assume a third pose 704, and attempts localization using two different cameras than what was used in the previous poses 700, 702. As before, the vehicle 100 may use the same cameras as in any of the previous poses 700, 702 or may use a different number of cameras. With these three rotations in the same location, the autonomous work vehicle 100 can gather enough visual data to localize, assuming the localization coordinates at the different rotations agree as described above, e.g., two out of three localizations are within a threshold value. If more than two cameras are made available after a new rotation, then more than two localizations can be made at the new rotation, and a third rotation may not be needed. Note that the rotations seen in FIG. 7 may be obtained in other ways besides rotating the vehicle 100, e.g., by rotating the cameras on the vehicle 100.

Figure 8:
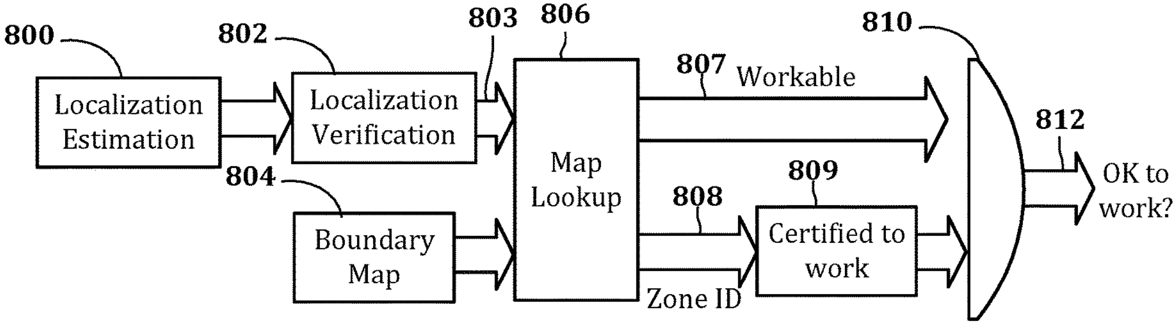
FIGS. 8-10 are diagrams showing components of an autonomous work vehicle localization system according to an example embodiment.

In FIG. 8, a diagram shows functional modules for autonomous work vehicle localization according to an example embodiment. A localization estimator 800 uses sensor fusion to estimate location (and orientation) using vision-based sensors non-vision-based sensors. A localization verification module 802 performs additional operations to ensure confidence in the estimations of the localization estimator 800. If the location is verified within some tolerance, the location is put into a map lookup module 806, which also receives boundary map data 804 that was previously generated in vehicle training.

The map lookup module 806 provides two outputs. The first output is a workable indicator 807 that the current location is workable, e.g., that the work implement such as mowing blades can be operated at this location. The second output is a zone identifier 808 that provides an indicator 809 as to whether the current zone is certified to work. Both of these outputs are combined at decision block 810 to output a signal 812 indicating that it is safe to perform work, which includes both movement of the vehicle and the operation of the work implement.

Figure 9:
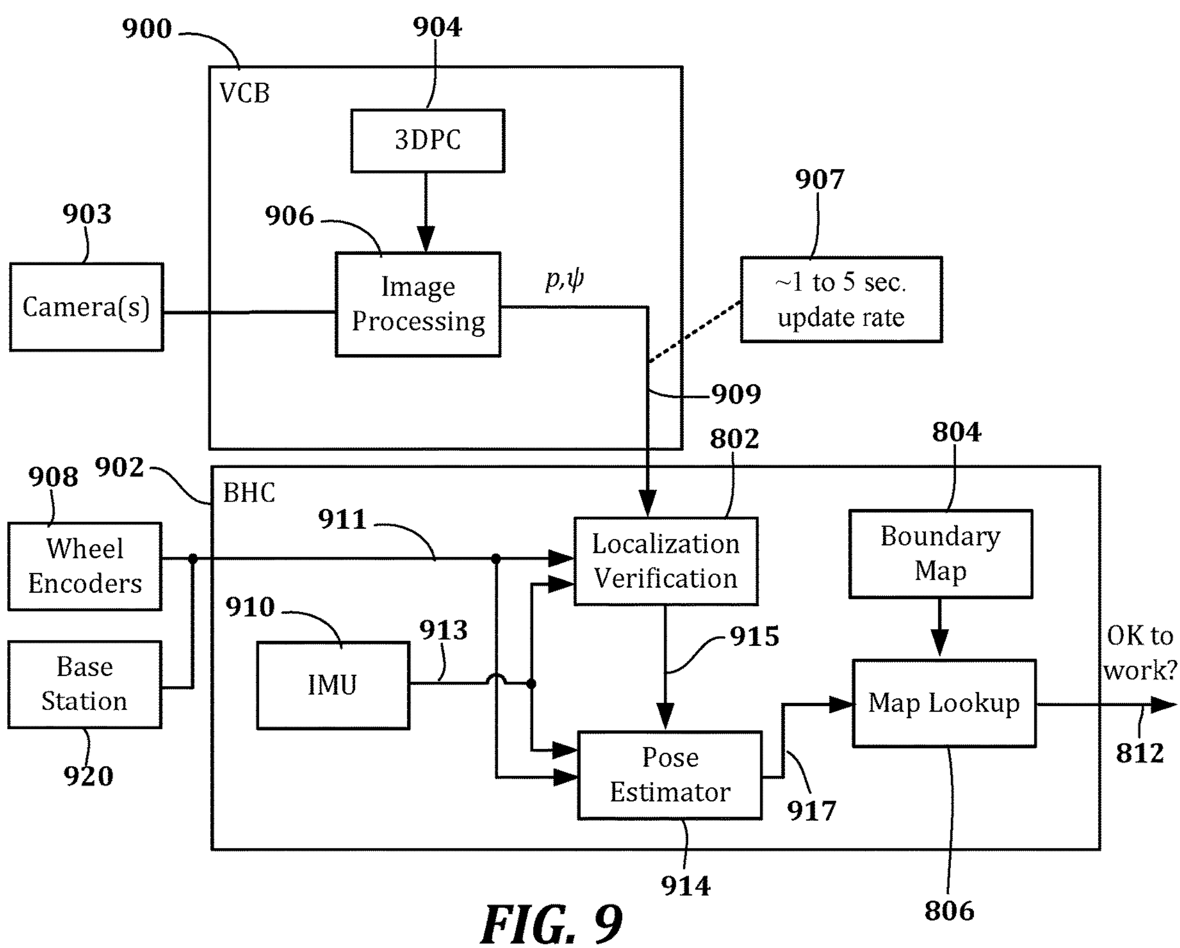

In FIG. 9, a diagram shows additional details of an autonomous work vehicle localization system according to an example embodiment. Two controllers are shown, a vision control board (VCB) 900 and a bottom half controller (BHC) 902. Generally, the VCB 900 receives and processes camera data from cameras 903. The VCB 900 also manages and interacts with the 3DPC 904. An image processing module 906 of the VCB 900 uses the camera data and 3DPC data to determine a position (p) and attitude (ψ) of the autonomous work vehicle. As indicated by block 907, the update rate of the position and attitude output 909 based on vision data may be relatively slow, on the order of 1 to 5 seconds. Generally, data processed by other sensors, such as wheel encoders 908 and IMU 908 will be much faster, e.g., ten times faster or more. Also note that a docking indication from the base/docking station 920 may be used as an indicator the autonomous work vehicle is in a pre-verified pose during startup.

The BHC 902 performs sensor fusion using outputs 909 of the VCB 900 with other outputs 911 and 913 from the wheel encoders 908 and IMU 910, the latter being shown in this example as being integrated into the BHC 902. The location verification function 802 determines location (e.g., relative coordinates to a local reference in the work region and/or absolute earth coordinates such a geolocation). The location verification function 802 provides a location output 915 that is used by a pose estimator 914, which estimates the pose 917 of the autonomous work vehicle. The pose 917 is used by the map lookup 806 as described above in the description of FIG. 8.

Figure 10:
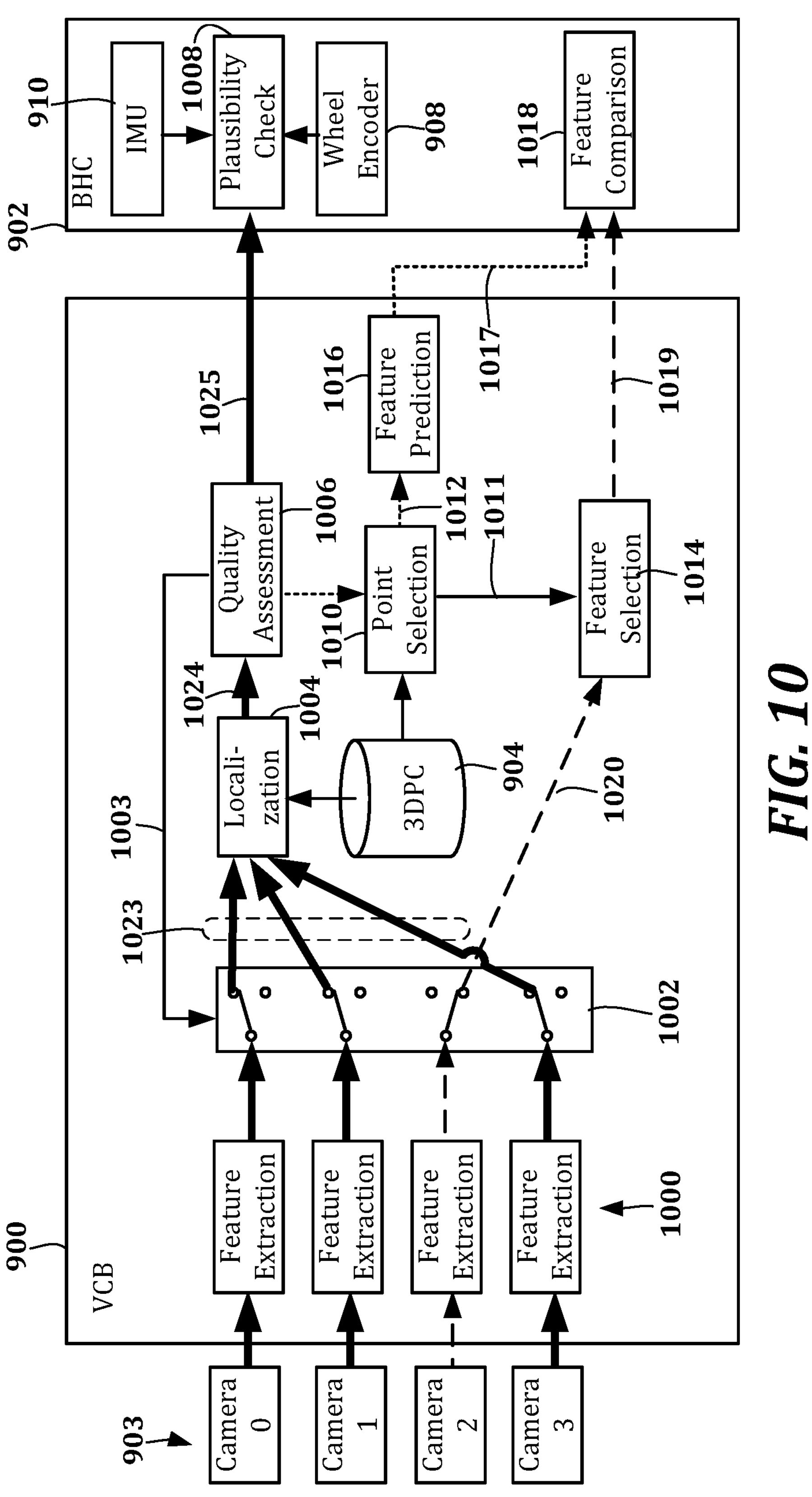

In FIG. 10, a diagram shows details of a VCB 900 and BHC 902 according to an example embodiment. In this example, image data from four cameras 903 are input to the VCB 900, features are extracted by separate feature extraction modules 1000 for each image feed. Each feature comprises a location in the corresponding image and an appearance vector that describes the content of the image in the neighborhood of the feature location. The lists of extracted features are routed through a set of switches 1002, which may be software-implemented.

As seen in the illustrated example, three of the data paths originating from cameras 0, 1, and 3 are marked with thicker, solid, lines and represent part of a primary localization data path 1023-1025. The data path originating from camera 2 is a supplementary data path (also referred to as a vision check data path) 1019-1020 is marked with a dashed line, and will be described in detail further below in relation to FIGS. 13, and 14. The selection of individual cameras 903 to be part of the primary data path 1023-1025 or supplementary data path 1019-1020 can be made dynamically. An input 1003 into the switch from a quality assessment module 1006 can reassign camera image data dynamically between the primary and supplemental paths. Note that the number of cameras used in the primary and supplemental paths may differ than what is shown here. For example, in some scenarios two primary path cameras may suffice for pose estimation, and may reduce the time needed for image-based localization. In other scenarios, more than one image may be used for the supplementary data path, e.g., where only two primary path cameras are used, wherein more than four cameras are available, etc.

The extracted features of the primary path 1023-1025 are sent from the switches 1002 to a localization module 1004, where their appearance vectors are used to associate them with points in the 3DPC 904. Once these associations are made, the localization module 1004 estimates position and orientation, or pose, based on the 3D positions of the map points and the 2D image positions of the features.

The quality of the localization result is evaluated in the quality assessment module 1006. If the system has poor confidence in the localization result, the localization may be repeated using a different combination of input cameras. Once a localization of sufficient quality has been performed, the localization result is combined with IMU 910 and wheel encoder data 908 to arrive at a final estimate at the BHC 902 at plausibility check module 1008. The plausibility check module 1008 combines estimate of location from both the VCB 900 and dead-reckoning data from the IMU and wheel encoders. During startup, the plausibility check module 1008 may also take an input (not shown) from a docking station which indicates that the work vehicle may be in a pre-verified pose.

Figure 11:
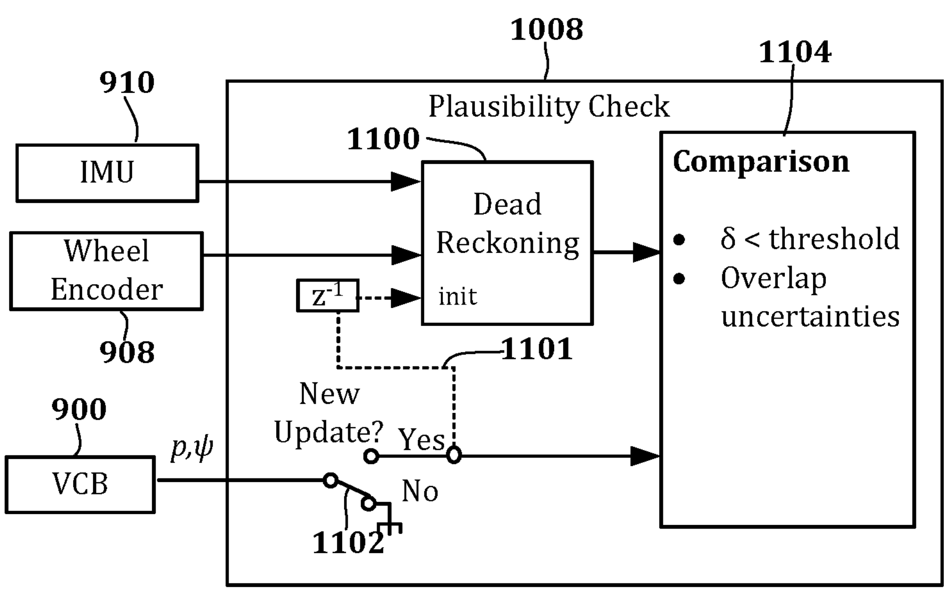
FIG. 11 is a diagram showing details of a plausibility check module according to an example embodiment.

In FIG. 11, a diagram shows details of the plausibility check module 1008 shown in FIG. 10. The IMU data 910 and wheel encoder data 908 is input to a dead-reckoning module 1100. Note that during startup, the autonomous work vehicle will not have any IMU data 910 or wheel encoder data 908 because the vehicle has not moved yet, and so will rely on vision data from the VCB 900 for an initial localization. This is indicated by path 1101, in which the vision-determined location is used to initialize the dead-reckoning module 1100.

Figure 12:
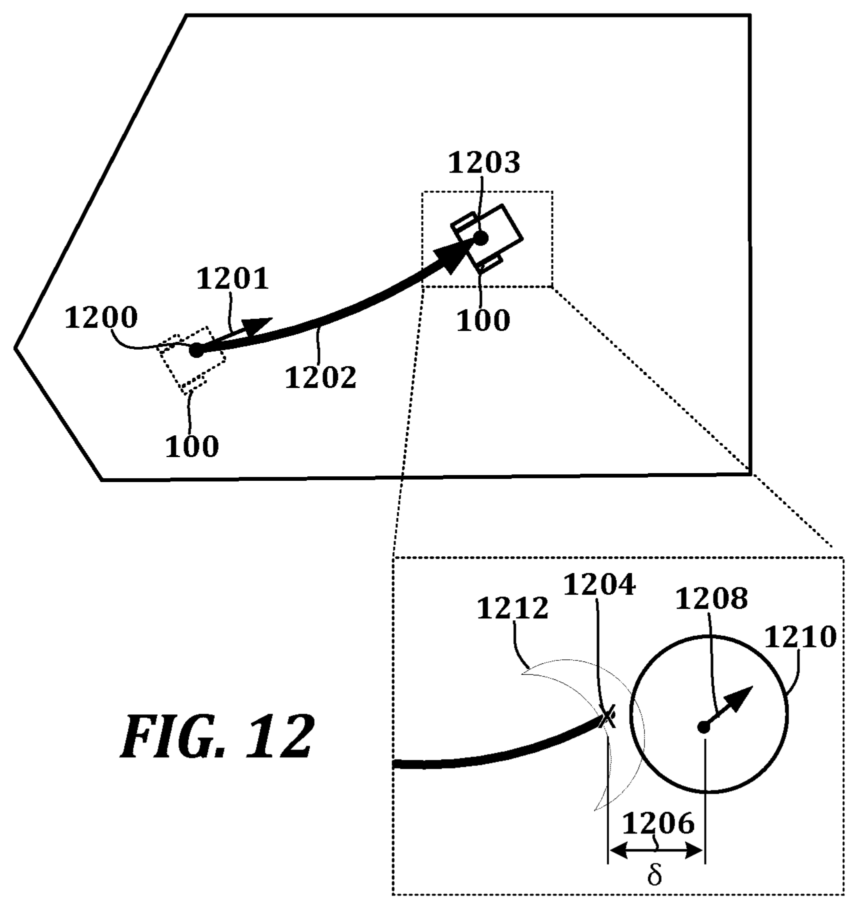
FIG. 12 is a diagram showing a comparison performed by a plausibility check module according to an example embodiment.

A switch 1102 feeds vision-based location data into the dead-reckoning module 1100 and a comparison module 1104 for each update of location from the VCB 900. The comparison module 1104 looks at a difference 8 between the dead-reckoning and vision-based locations, as well as overlap uncertainties. A diagram in FIG. 12 illustrates how a comparison in a plausibility check module is performed according to an example embodiment. An autonomous work vehicle 100 begins at point 1200 (where the vehicle is indicated with dotted lines), and this may be a start point in which the vehicle 100 is placed or initialized. The vehicle

100 therefore obtains a vision-based pose 1201 from the VCB 900 as described above (which may also include a docking station pre-verified pose indicator), which is used to seed the dead-reckoning module 1100.

After the initial pose 1201 is determined, the autonomous work vehicle 100 moves along path 1202 using dead-reckoning, e.g., based on one or both of the wheel encoder data 908 and IMU data 910. The vehicle 100 (drawn in solid line) arrives at point 1203, during which a plausibility check comparison is made between a first location estimation 1204 based on dead-reckoning and the location of a vision-based pose estimate 1208. The comparison module 1104 determines whether these location estimates 1204, 1208 are within a threshold 1206. This comparison also takes into account uncertainties of the location of the vision-based pose estimate 1208, indicated by circle 1210, and uncertainty distribution of the dead-reckoning position 1204, indicated by crescent-shaped region 1212.

Assuming the vision based pose estimate 1208 is plausible based on the comparison, the pose estimate 1208 is used to seed the dead-reckoning module 1100 and the process completes. If the comparison indicates a sufficiently large discrepancy between the locations estimates 1204, 1208, then further action may be taken, e.g., changing cameras used for vision-based pose estimate, rotating the vehicle 100 before performing another vision-based pose estimate, etc.

In reference again to FIG. 10, the supplementary data path 1019-1020 (or vision check data path) can be used in situations where an improved and/or higher level of confidence in vision based localization is needed. This may be in cases where the vehicle 100 is initialized in an arbitrary location, where the plausibility check with dead-reckoning sensors indicates a discrepancy, where cameras are blocked, etc. The quality assessment module 1006 can make those determinations, and in response to additional checks being triggered, a point selection module 1010 is instructed to choose 3D points 1012 from the 3DPC map that are expected to be visible in the camera not used for vision-based localization (camera 2 in this example). Because this camera points in a different direction than the other three cameras, the selected points 1012 are different than the ones used in localization along the primary path 1023-1025 (bold lines in this figure).

Figure 13:
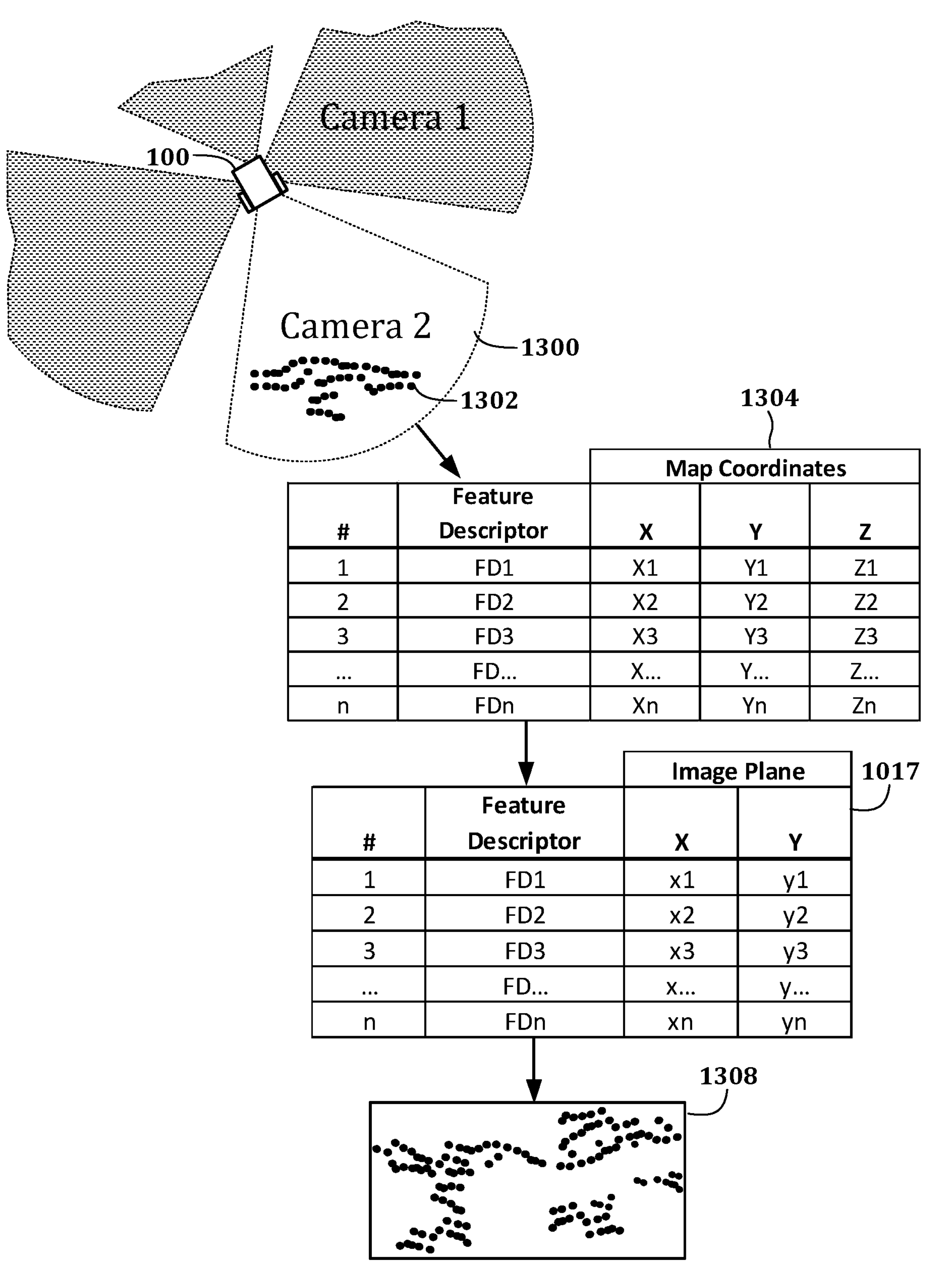
FIG. 13 is a diagram showing operation of a feature prediction module according to an example embodiment.

The selected points 1012 are passed to a feature prediction module 1016 which is used to predict what the features would look like in the view of the vision check camera, and provides a data collection of those features, such as a feature list 1017. In FIG. 13, a diagram shows an example of how the feature prediction module 1016 operates according to an example embodiment. The vehicle 100 is shown in a pose in the work area, with region 1300 indicating the view of the check image camera. In this view are known features 1302, which have previously been detected and added to the 3DPC 904. Based on the current pose estimate obtained from the primary path 1023-1025, the feature prediction module 1016 can select all expected feature points 1302 in vision check camera view 1300, and map them into a collection, as represented by table 1304. Each entry in the table 1304 includes a descriptor of a feature, and its coordinate in 3-space.

In addition to the features table, the feature generation module 1016 may access data that describes properties of the vision check camera, such as resolution, vertical and horizontal field of view and orientation relative to the vehicle 100. This can be used to transform three-dimensional point coordinates in table 1304 to a collection of two-dimensional points, which are shown within predicted feature list 1017. The two-dimensional points are used to determine the feature descriptors (e.g., obtained by querying the 3DPC) that are also shown in the predicted features list 1017.

The data in the predicted feature list 1017 are located within a boundary rectangle that corresponds to an image plane 1308 that would be produced by the vision check camera. This image 1308 reflects the expected image plane results from the vision check camera, simplified to just show the feature points. Note that an actual image 1308 need not be produced by the feature generation module 1016, although may be in some cases. A simplified representation such as collection of feature points in predicted feature list 1017 may be sufficient.

The predicted feature points in the predicted feature list 1017 are compared to data of actual points measured via the vision check camera. In reference again to FIG. 10, a feature selection module 1014 receives the check image data 1020 from the vision check camera on the supplemental path and decomposes the check image data 1020 into features in a similar manner as the features previously generated for the 3DPC 904. The point selection module 1010 provides a list of descriptors 1011 (or any other data structure containing a collection of descriptors) to the feature selection module 1014, but not the locations. The feature selection module 1014 searches in the check image data 1020 for the features in the list of descriptors 1011, and provides a collection of matched features, e.g., measured feature list 1019, which is provided to a feature comparison module 1018 of the BHC 902 together with the predicted feature list.

Figure 14:
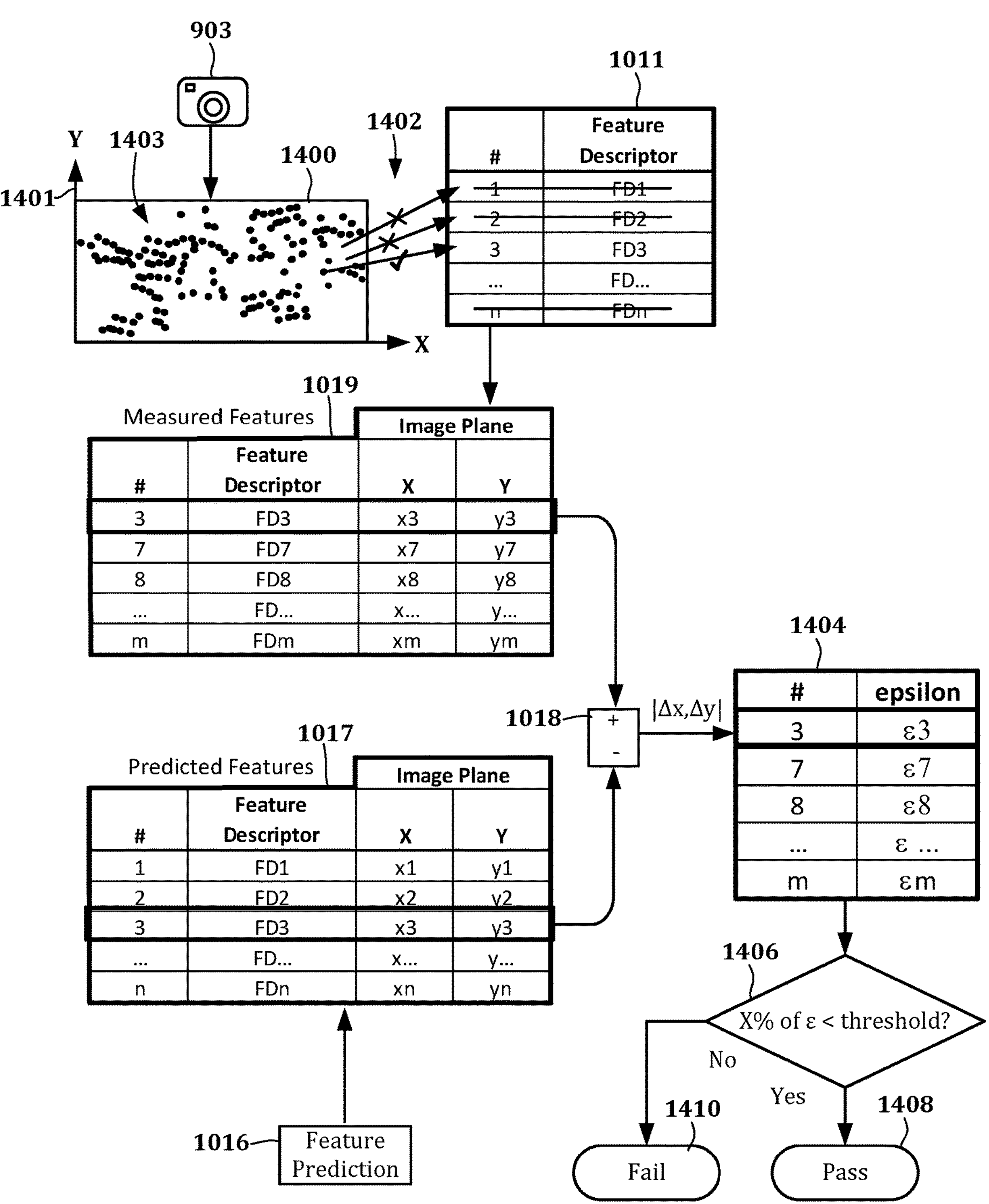
FIG. 14 is a diagram showing operation of a feature selection module according to an example embodiment.

The operation of the feature selection module 1014 according to an example embodiment is illustrated in FIG. 14, in which a check image 1400 is shown that has been decomposed into its detected features 1403. The axes 1401 indicate a coordinate system that define an image plane of the check image 1400. The origin and orientation of the axes 1401 may be different than shown. The data in the check image 1400 comes from the vision check camera 903 (e.g., camera 2 shown in FIG. 10).

The detected features 1403 are compared with the list of descriptors 1011 provided by the point selector 1010, as indicated by arrows 1402. Any features for which a match is not found is discarded, as indicated by the crossed-thru rows in the list of descriptors 1011. This is used to form table 1019, which includes the observed descriptors and image-plane locations of those descriptors. The data in this table 1019 is sent to the BHC 902, where each entry is compared with corresponding entries in the predicted feature list 1017 by the feature comparison module 1018. A deviation between the predicted location and measured location for each feature is determined, as indicated by list 1404. In this example, epsilon error $|\Delta x, \Delta y|$ is used to define the deviation, but other error measures could be used (e.g., $\mathrm{sqrt}[\Delta x^2 + \Delta y^2]$).

As indicated by block 1406, a criterion is used to determine whether or not the deviations in list 1404 pass a threshold. In the illustrated block, the criterion involves determining whether some percentage of the total features have errors below a threshold value of $\varepsilon$. If this criterion is satisfied, it results in a pass 1408 value being output for the vision-based localization estimate. Other calculations on the collective errors in the list 1404 could be used instead of or in addition to what is shown in block 1406, such as an average $\varepsilon$, median $\varepsilon$, weighted average of $\varepsilon$ (e.g., based on confidence level of detected features), etc. The output of the block 1406 is used for operational safety functions of the autonomous work vehicle 100, such as the localization verification 802 shown in FIG. 8.

If the comparison in block 1406 indicates a failure 1410 to localize, the autonomous work vehicle may be able to take remedial actions previously described. For example, described in relation to FIG. 6, different primary and supplementary path cameras may be selected for pose estimate and the check image. As described in relation to FIG. 7, the vehicle may rotate in place and then attempt to re-localize with the same or different cameras being assigned to pose estimation via the primary path and generating the check image via the supplemental path. In some embodiments, if fewer than three cameras are initially used in the primary path for pose estimation (e.g., two cameras) and additional camera can be employed in the primary path. A similar change may be made to the supplemental path, e.g., choosing more than one camera to generate a check image.

In some embodiments, the number of predicted features 1017 could be in the thousands, e.g., around 5000 features. This may change based on system variables such as the resolution of the cameras, maximum size of the features, etc. In some embodiments, the size of the measured features 1019 that are compared may be significantly smaller, e.g., in the hundreds, about 100. Selecting a small subset of the matched features can reduce validation processing time by 10× to 50×, without significant loss in confidence in the results.

In an analysis of the feature matching using machine data logs, the probability that an observed 2D image location lay within five pixels of its predicted 2D image location was assumed to be 0.75, given that the pose estimate was within 10 cm of ground truth. This analysis also computed the likelihood that a particular pose estimate lies within 10 cm of ground truth over the entire dataset (0.9), and the likelihood that a randomly selected 2D image location lay within five pixels of its predicted 2D image location, independent of the quality of the pose estimate (0.68). Given these numbers, Bayes rule was used to compute the likelihood that a pose is good based on the number of matching observation/prediction pairs in the data provided to the feature comparison module 1018. For a total of 100 potential matches, the likelihood of a good pose is greater than 0.99996 whenever the number of matching pairs is greater than or equal to 35. Accordingly, the location module can randomly select around 100 observation/prediction pairs, calculate the number of pairs that match within five pixels, and rejects the pose estimate if fewer than 35 pairs pass the test.

This analysis also calculated, for each pixel location in the image, the likelihood that a randomly selected 2D image location prediction lies within five pixels of the random location. This likelihood is highest near the middle of the image, because this is where the map features are most commonly found, with a maximum of 0.01. Similarly the likelihood that a randomly selected 2D image location observation lies within five pixels of a randomly selected image location is highest near the middle of the image, again with a maximum of approximately 0.01. Note that the actual values described above may change based on assumptions and other system data, however these estimates generally indicate that the vision check system is likely to be accurate and reliable.

Figure 15:
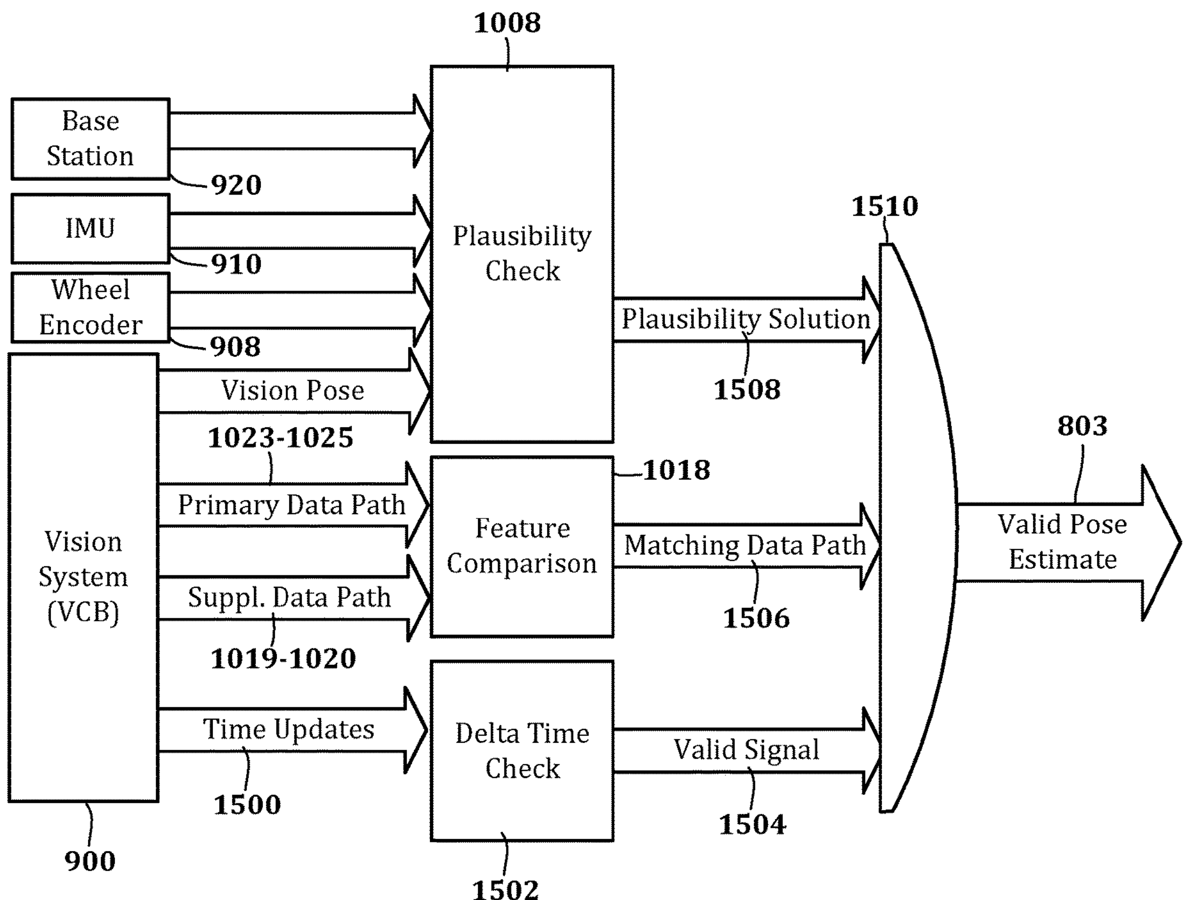
FIG. 15 is a high-level representation of the vision system checks according to an example embodiment.

In FIG. 15, a diagram shows a high-level representation of the vision system checks according to an example embodiment. The inputs and modules shown in this figure related to plausibility checks and feature checks were previously described in detail. An additional check shown here is performed by a delta time check module 1502 that receives time updates 1500 from the VCB. These time updates 1500 may be similar to keep-alive messages used to poll a device to determine whether it is non-responsive. If an elapsed time between updates is within a threshold, then the delta time check module 1502 indicates a valid signal 1504. If this valid signal 1504 and the other vision check outputs 1506, 1508 are present, affirmative, etc., then a summation block 1510 (e.g., AND gate) outputs a valid pose estimate 803, which can be seen being input to the map lookup 806 in FIG. 8.

One safety issue identified in this type of vision-based localization system is in cases where the feature comparison shows a positive result (e.g., confirms location within desired threshold) but localization is actually incorrect, e.g., has provided erroneous pose data such that the autonomous work vehicle is not where in the location it verified using vision sensors and feature comparison module 1018. In reference again to FIG. 10, the following sections discuss the role that the feature selection module 1014, the switch module 1002, the feature extraction module 1000, and cameras 903 might play in causing erroneous localization.

The first module considered is the feature selection module 1014. In order for the feature comparison to erroneously pass, a corresponding list of observed 2D feature positions 1019 would be transmitted to the feature comparison module 1018 from the supplemental path, and a plurality of those features would match the predicted features 1017 received via the primary path. The only module in the primary path that transmits data to the feature comparison module 1018 is the feature selection module 1014. One type of failure is that the feature selection module 1014 transmits incorrect 2D image locations (2D image locations that don't correspond to the features received from the switch module 1002) that match the predicted 2D feature locations 1017, even though the pose estimate is incorrect.

One cause of this could be that the feature selection module 1014 somehow gains access to the predicted 2D image locations 1017. In such a case, the feature selection module 1014 might forward these predicted locations to the BHC 902, leading to a perfect comparison. By design, the feature selection module 1014 has no access to the predicted 2D image locations 1017. These are transmitted from the feature prediction module 1016 only to the BHC. Furthermore, the feature prediction module 1016 has no direct connection to the feature selection module 1014. Therefore, the likelihood of an error causing the predicted 2D image locations to be transmitted to the BHC by the feature selection module 1014 is very small. Nevertheless, this possibility can be addressed by having the BHC 902 reject any matches in which the 2D image location and predicted 2D image location are bit-for-bit identical.

Another error may involve transmission of duplicate 2D image location data that matches the predicted 2D image locations 1017. This might happen if the predicted 2D image locations are unchanged from the previous localization, and an error causes the feature selection module 1014 to simply retransmit 2D image locations from the previous localization. This is a plausible failure, and it can be resolved on the BHC 902 by rejecting repeated data from the feature selection module 1014.

Another type of error involves transmission of degenerate 2D image location data that matches the predicted 2D image locations. This might happen if the feature selection module 1014 transmits a list of zero length, or a list in which all image locations are set to zero, or some other value. It is difficult to see how these values could match the predicted 2D image locations without there being a matching failure in the primary data path. Regardless, these failures can be remedied by rejecting discarding poses for which the list of observed 2D locations sent to the feature comparison module 1018 has an incorrect length, or poses for which the 2D image coordinates have very low entropy.

Another type of error involves transmission of non-degenerate, non-duplicate 2D image locations that don't correspond to the actual features in the input image, and which do match the predicted 2D image locations. It would not be expected that the BHC 902 could detect this, but its likelihood is vanishingly small. In order for this to happen, the error would have to accurately predict a series of 50 or more different 2D image coordinates, each likely represented by a 32-bit floating-point number. The likelihood of accidentally synthesizing a series of more than a few matching numbers is very small, and can be reduced to any desired level simply by ensuring that the list of image locations is sufficiently long. Recall from above that the likelihood of an accidentally synthesized 2D image coordinate having a good match is less than 0.01. This means that the likelihood of a sequence of such numbers passing the feature comparison module 1018 check is less than 0.000001.

Another possible mode of failure is that the feature selection module 1014 transmits correct 2D image locations (2D image locations that correspond to the features received from the switch module 1002) that match the predicted 2D image locations, even though the pose estimate is incorrect. This case means that something has gone wrong upstream (on the supplemental path) from the feature selection module 1014. One of those components is the switch module 1002. There are two ways that the switch module 1002 can transmit features containing 2D image locations that match the predicted 2D image locations, even though the pose estimate is incorrect. One way is that the switch module 1002 transmits incorrect features (features that don't correspond to those received from the correct feature extraction module 1000) that have 2D image locations matching the predicted 2D image locations, even though the pose estimate is incorrect. There may a number of reasons for this. For example, an error leads to the switch module 1002 transmitting features from an incorrect feature extraction module 1000, and those features contain 2D image locations matching the predicted 2D image locations. This case involves the features extracted from the incorrect image having 2D image locations that match the predicted 2D image locations.

This error could happen if this erroneously selected camera were actually looking at the part of the scene predicted by the primary data path. For example, this could happen if the switch module 1002 were to erroneously direct data from an incorrect camera to the feature selection module 1014, and localization happened to be wrong by exactly a rotation of 90°, 180°, or 270°, placing the incorrect camera in precisely the position and orientation predicted for the correct camera. This situation is addressed by maintaining an independent estimate of rotation on the BHC 902 by integrating the on-board IMU and wheel encoders. As long as the uncertainty of this estimate has not grown beyond 90° since the last good pose estimate, then it can be used to identify and reject pose estimates that reflect these large angular errors.

Additionally, statistical analysis of data logs involving a total of 100,000 localizations in representative operating environments show no instances of incorrectly estimated pose in which the orientation error was sufficiently close to 90°, 180°, or 270° that the feature comparison module 1018 test could have been fooled. Finally, assuming a uniform distribution of rotation error in incorrect pose estimates, we calculate that such an error is likely to occur in fewer than 0.2% incorrect pose estimates. Based on these numbers, the likelihood of such an error in the switch module 1002 being coincident with a perfectly aligned incorrect pose estimate is vanishingly small. This very small likelihood can be further mitigated by logging and reporting any cases where such a coincidence is identified by comparison with the BHC orientation estimate, so that the root cause of the switch module 1002 error can be identified and addressed.

This could also happen if the switch module 1002 were to erroneously direct data from an incorrect feature extraction module 1000 to the feature selection module 1014, and the incorrect camera were looking at a portion of the environment that closely matches the appearance of the predicted scene. For example, this could happen if the system were to incorrectly localize, and a large moving or repeating structure in the scene happened to line up with the vision check camera in a way that was consistent with the incorrect localization. All of the arguments of the preceding paragraph apply to this condition as well, with the exception that the orientation errors are not limited to 90°, 180°, or 270°, so comparison with the BHC orientation estimate may be less effective.

Another way that the switch module 1002 can erroneously transmit features containing 2D image locations that match the predicted 2D image locations is that an error leads to the switch module 1002 transmitting features that do not originate from any feature extraction module 1000, and those features contain 2D image locations matching the predicted 2D image locations. This might involve the switch module 1002 accidentally synthesizing a sequence of features that match the prediction from the primary data path. The argument here is very similar to the argument against an error in the feature selection module 1014 leading to accidental synthesis of matching 2D image location data. That is, an error that leads to the transmission of duplicate or degenerate data is easy for the BHC to detect, and an error that leads to the accidental synthesis of matching 2D image locations is extremely unlikely, since passing the BHC check requires a close match between a long sequence of numbers. Note that the feature list is not stored in the switch module, it is simply forwarded to the appropriate downstream module, so any such corruption of the transmitted feature data is likely to be limited to transmission errors.

Another situation to consider is if the switch module 1002 transmits correct features (features that correspond to those received from the correct feature extraction module 1000) that have 2D image locations matching the predicted 2D image locations, even though the pose estimate is incorrect. This case means that something has gone wrong upstream (on the supplemental path) of the switch module 1002, such as the feature extraction module 1000.

There are two ways that a feature extraction module 1000 can transmit features containing 2D image locations that match the predicted 2D image locations, even though the pose estimate is incorrect. A first way is that the feature extraction module 1000 transmits features that do not match its input image, and those features contain 2D image locations that match the predicted 2D image locations. This situation parallels the similar situations already discussed for the switch module 1002 and the feature selection module 1014. An error that leads to the transmission of duplicate or degenerate data is easy for the BHC 902 to detect, and an error that leads to the accidental synthesis of matching 2D image locations is extremely unlikely, since passing the BHC 902 check requires a close match between a long sequence of numbers.

A second way that the feature extraction module 1000 can erroneously transmit data is to transmit features that do match its input image, and those features have 2D image locations that match the predicted 2D image locations, even though the pose estimate is incorrect. This case means that something has gone wrong upstream (on the supplemental path) of the feature extraction module 1000, such as the camera module.

There are two ways that a camera module can transmit an image that matches the predicted vision check scene, even though the pose estimate is incorrect. A first is that the camera module transmits incorrect image data (an image that doesn't match the incident light on its image sensor), and this incorrect image data contains features with 2D image locations that match the predicted 2D image locations. This situation parallels the similar situations already discussed for the feature extraction module 1000, the switch module 1002 and the feature selection module 1014. An error that leads to the transmission of duplicate or degenerate data is easy for the BHC 902 to detect, and an error that leads to the accidental synthesis of an image that closely matches the predicted scene is extremely unlikely, since passing the BHC 902 check requires a close match between a long sequence of numbers, and the observed image locations are derived from an even longer sequence of numbers (image pixel values).

A second scenario is that the camera module transmits correct image data (an image that does match the incident light on its image sensor), and this correct image data contains features with 2D image locations that match the predicted 2D image locations, even though the pose estimate is incorrect. For this to happen, the actual scene observed by the camera module must match the predicted scene, even though the pose estimate is incorrect. For example, this could happen if the vehicle is operating indoors through a series of identical rooms. In this situation, each position and orientation in the first room is visually indistinguishable from the matching position and orientation in each of the identical rooms. If the pose estimate were to erroneously place the system in the wrong room, the scene visible to the vision check camera might be sufficiently similar to the predicted scene that the location comparison check could pass. This situation can be avoided by prohibiting operation in repeating environments. Additionally, an error such as the one described here would almost certainly involve a "jump" in the pose estimate, which would be inconsistent with IMU and wheel encoder data.

Figure 16:
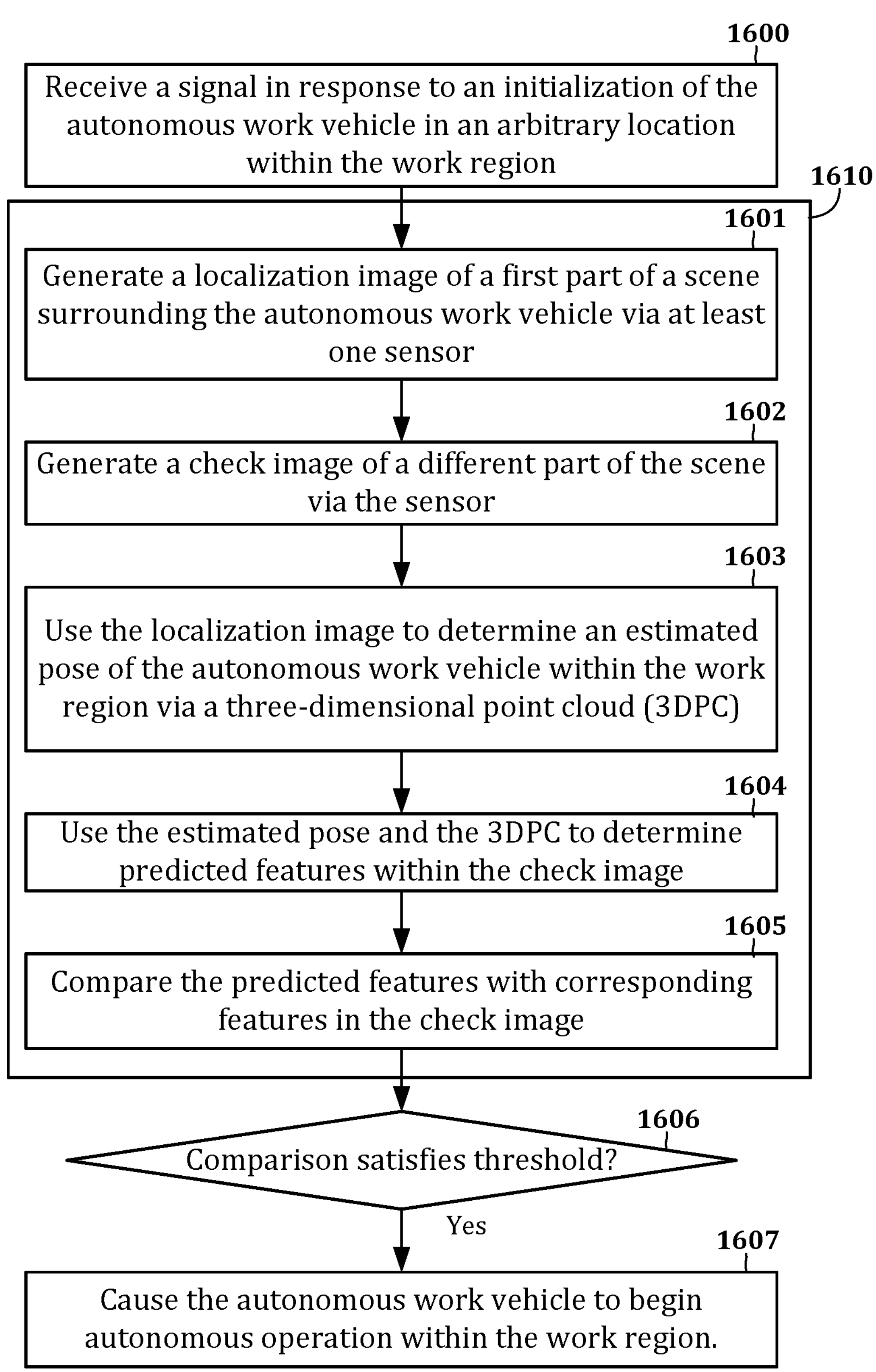
FIGS. 16 and 17 are flowcharts showing methods according to example embodiments.

In FIG. 16, a flowchart shows a method according to an example embodiment. The method involves receiving 1600 a signal in response to an initialization of the autonomous work vehicle in an arbitrary location within the work region. In response to the signal, a localization process 1610 is performed. In the localization process 1610, a localization image is generated 1601 of a first part of a scene surrounding the autonomous work vehicle via at least one sensor. A check image of a different part of the scene is generated 1602 via the at least one sensor. The localization image is used 1603 to determine an estimated pose of the autonomous work vehicle within the work region via a three-dimensional point cloud (3DPC) accessible on the autonomous work vehicle.

The estimated pose and the 3DPC are used 1604 to determine predicted features within the check image. A comparison 1605 is performed between the predicted features and corresponding features in the check image. In response to the comparison satisfying the threshold as determined at block 1606, the autonomous work vehicle is caused 1607 to begin autonomous operation within the work region, e.g., the vehicle begins to execute a program to navigate and work in the work region.

Figure 17:
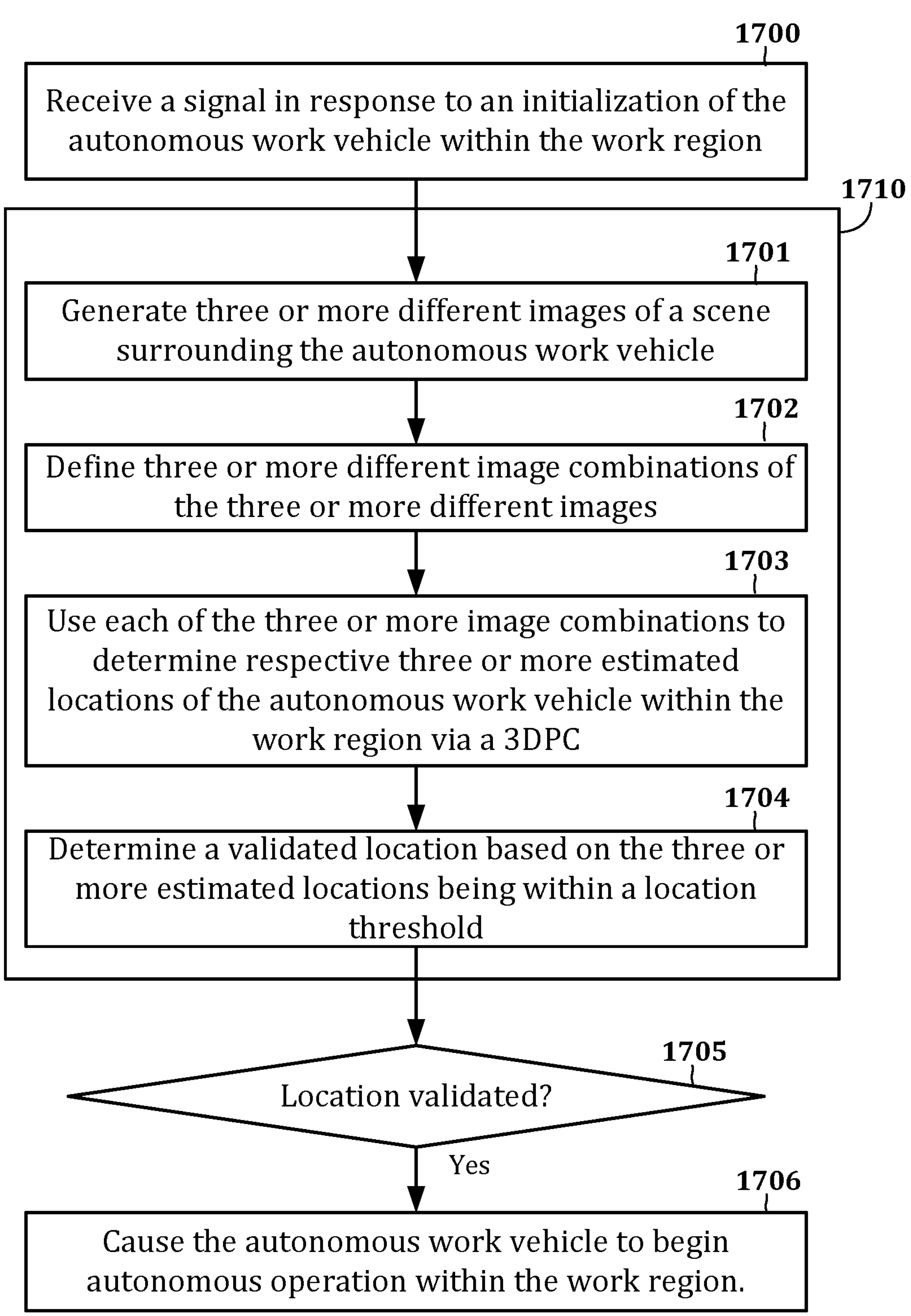

In FIG. 17, a flowchart shows a method according to another example embodiment. The method involves receiving 1700 a signal to start an autonomous operation mode of the autonomous work vehicle within the work region. In response to the signal, perform a localization process 1710 is performed that involves generating 1701 three or more different images of a scene surrounding the autonomous work vehicle. Three or more different image combinations (e.g., pairs) of the three or more different images are defined 1702.

Each of the three or more image combinations is used 1703 to determine respective three or more estimated locations of the autonomous work vehicle within the work region via a 3DPC accessible by the autonomous work vehicle. A validated location is determined 1704 based on the three or more estimated locations being within a location threshold. In response to validating 1705 the location, the autonomous work vehicle is caused 1706 to begin autonomous operation within the work region.

While the present disclosure is not so limited, an appreciation of various aspects of the disclosure will be gained through a discussion of the specific illustrative examples provided below. Various modifications of the illustrative examples, as well as additional embodiments of the disclosure, will become apparent herein.

Embodiment 1 is an autonomous work vehicle, comprising: at least one sensor operable to generate a localization image of a part of a scene surrounding the autonomous work vehicle, and a check image of a different part of the scene; and a controller coupled to the at least one sensor and having access to a stored three-dimensional point cloud (3DPC) that represents a work region of the autonomous work vehicle. The controller is operable to receive a signal to start an autonomous operation mode of the autonomous work vehicle within the work region and in response to the signal, perform a localization process comprising: generating the localization image and the check image; using the localization image to determine an estimated pose of the autonomous work vehicle within the work region via the 3DPC; using the estimated pose and the 3DPC to determine predicted features within the check image; and performing a comparison between the predicted features and corresponding features in the check image, and validate the estimated pose based on the comparison satisfying a threshold.

Example 2 includes the autonomous work vehicle of example 1, wherein using the localization image to determine the estimated pose comprises: querying the 3DPC to determine three-dimensional points within the different part of the scene based on the estimated pose; mapping the three-dimensional points to two-dimensional points within an image plane of the check image; and generating predicted feature descriptors of the predicted features based on the two-dimensional points. Example 3 includes the autonomous work vehicle of example 2, wherein performing the comparison between the predicted features and corresponding features in the check image comprises determining the predicted feature descriptors are located within a threshold distance of corresponding feature descriptors of the corresponding features of the check image. Example 4 includes the autonomous work vehicle of example 3, wherein the predicted feature descriptors characterize first pixel values in a first neighborhood of the predicted features and the corresponding feature descriptors characterize second pixel values in a second neighborhood of the corresponding features.

Example 5 includes the autonomous work vehicle of any one of examples 1-4, wherein the at least one sensor comprises four cameras each facing a different direction from one another, and wherein the check image is generated from a first camera of the four cameras and the localization image comprises three images taken from three of the four cameras different from the first camera. Example 6 includes the autonomous work vehicle of any one of examples 1-5, wherein the localization process further comprises determining that the comparison does not satisfy the threshold, and in response thereto, using a first different image from the at least one sensor as the localization image, using a second different image from the at least one sensor as the check image, and repeating the localization process.

Example 7 includes the autonomous work vehicle of any one of examples 1 and 5-6, wherein the corresponding features comprise appearance descriptors that characterize pixel values in a neighborhood of two-dimensional locations within the check image. Example 8 includes the autonomous work vehicle of any one of examples 1-6, wherein the comparison comprises determining that a threshold number of the predicted features are within a pixel distance threshold of the corresponding features. Example 9 includes the autonomous work vehicle of any one of examples 1-8, wherein the signal comprises an initialization of the autonomous work vehicle in an arbitrary location within the work region.

Example 10 is method of localizing an autonomous work vehicle within a work region, comprising: receiving a signal in response to an initialization of the autonomous work vehicle in an arbitrary location within the work region; in response to the signal, performing a localization process comprising: generating a localization image of a first part of a scene surrounding the autonomous work vehicle via at least one sensor; generating a check image of a different part of the scene via the at least one sensor; using the localization image to determine an estimated pose of the autonomous work vehicle within the work region via a three-dimensional point cloud (3DPC) accessible by the autonomous work vehicle; using the estimated pose and the 3DPC to determine predicted features within the check image; and performing a comparison between the predicted features and corresponding features in the check image; and in response to the comparison satisfying a threshold, causing the autonomous work vehicle to begin autonomous operation within the work region.

Example 11 includes the method of example 10, wherein using the localization image to determine the estimated pose comprises: querying the 3DPC to determine three-dimensional points within the different part of the scene based on the estimated pose; mapping the three-dimensional points to two-dimensional points within an image plane of the check image; and generating predicted feature descriptors of the predicted features based on the two-dimensional points. Example 12 includes the method of example 11, wherein performing the comparison between the predicted features and corresponding features in the check image comprises determining the predicted feature descriptors are located within a threshold distance of corresponding feature descriptors of the corresponding features of the check image. Example 13 includes the method of example 12, wherein the predicted feature descriptors characterize first pixel values in a first neighborhood of the predicted features and the corresponding feature descriptors characterize second pixel values in a second neighborhood of the corresponding features.

Example 14 includes the method of any one of examples 10-13, wherein the check image is generated from a first camera and the localization image is taken from three cameras different from the first camera. Example 15 includes the method of any one of examples 10-14, wherein the localization process further comprises determining that the comparison does not satisfy the threshold, and in response thereto, using a different set of images as the localization image and the check image, and repeating the localization process. Example 16 includes the method of any one of examples 10 and 13-15, wherein the corresponding features comprise appearance descriptors that characterize pixel values in a neighborhood of two-dimensional locations within the check image. Example 17 includes the method of any one of examples 10-15, wherein the comparison comprises determining that a threshold number of the predicted features are within a pixel distance threshold of the corresponding features.

Example 18 is an autonomous work vehicle, comprising: two or more sensors operable to generate two or more respective independent localization data, a first localization data of the two or more independent localization data comprising a first image of a scene surrounding the autonomous work vehicle from a first camera; and a controller coupled to the two or more sensors and having access to a stored three-dimensional point cloud (3DPC) that represents a work region of the autonomous work vehicle, the controller operable to: receive a signal to start an autonomous operation mode of the autonomous work vehicle within the work region; in response to the signal, perform a localization process comprising: generating the two or more independent localization data; determining a first pose estimate via the 3DPC using the first localization data; determining a second pose estimate using on a second localization data of the two or more independent localization data; and determining a validated pose based on the first and second pose estimates being separated by less than a threshold amount.

Example 19 includes the autonomous work vehicle of example 18, wherein the second localization data comprises an indication that the autonomous work vehicle is in a docking station resulting in the autonomous work vehicle being in a pre-verified pose. Example 20 includes the autonomous work vehicle of example 18, wherein the second localization data comprises a second image of the scene from a second camera, the second image providing the second pose estimate via the 3DPC. Example 21 includes the autonomous work vehicle of example 20, wherein the two or more independent localization data comprise a third image of the scene from a third camera, the third image providing a third pose estimate via the 3DPC, and wherein the localization process further comprises determining three or more comparisons between respective three or more pairs of the first, second, and third pose estimates, the validated pose being determined based on at least one of the three or more pairs being separated by less than the threshold amount.

Example 22 includes the autonomous work vehicle of example 21, wherein the validated pose is based on a majority of the three or more pairs being separated by less than the threshold amount. Example 23 includes the autonomous work vehicle of examples 21 or 22, wherein the two or more independent localization data comprise a fourth image of the scene from a fourth camera, the fourth image providing a fourth pose estimate via the 3DPC, the three or more comparisons comprising six comparisons between respective six pairs of the first, second, third, and fourth pose estimates. Example 24 includes the autonomous work vehicle of example 18 or 20, wherein the controller is further operable to determine that at least one image used to determine the first and second pose estimates is unusable and in response thereto, rotate the autonomous work vehicle and repeat the localization process.

Example 25 is method of localizing an autonomous work vehicle within a work region, comprising: receiving a signal to start an autonomous operation mode of the autonomous work vehicle within the work region; in response to the signal, perform a localization process comprising: generating two or more different independent localization data from two or more independent sensors, a first independent localization data comprising a first image of a scene surrounding the autonomous work vehicle from a first camera; determining a first pose estimate using the first localization data via a three-dimensional point cloud (3DPC) accessible by the autonomous work vehicle; determining a second pose estimate using on a second localization data of the two or more independent localization data; determining a validated pose based on the first and second pose estimates being separated by less than a threshold amount; and in response to determining the validated pose via the localization process, causing the autonomous work vehicle to begin autonomous operation within the work region.

Example 26 includes the method of example 25, wherein the second localization data comprises an indication that the autonomous work vehicle is in a docking station resulting in the autonomous work vehicle being in a pre-verified pose. Example 27 includes the method of example 25, wherein the second localization data comprises a second image of the scene from a second camera, the second image providing the second pose estimate via the 3DPC. Example 28 includes the method of example 27 wherein the two or more independent localization data comprise a third image of the scene from a third camera, the third image providing a third pose estimate via the 3DPC, and wherein the localization process further comprises determining three or more comparisons between respective three or more pairs of the first, second, and third pose estimates, the validated pose determined based on at least one of the three or more pairs being separated by less than the threshold amount.

Example 29 includes the method of example 28, wherein the validated pose is based on a majority of the three or more pairs being separated by less than the threshold amount. Example 30 includes the method of examples 28 or 29, wherein the two or more independent localization data comprise a fourth image of the scene from a fourth camera, the fourth image providing a fourth pose estimate via the 3DPC, the three or more comparisons comprising six comparisons between respective six pairs of the first, second, third, and fourth pose estimates. Example 31 includes the method of any one of examples 25 or 27, further comprising determining that at least one image used to determine the first and second pose estimates is unusable and in response thereto, rotate the autonomous work vehicle and repeat the localization process.

While the present disclosure is not so limited, an appreciation of various aspects of the disclosure will be gained through a discussion of the specific illustrative aspects provided below. Various modifications of the illustrative aspects, as well as additional aspects of the disclosure, will become apparent herein.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine is in an operating configuration. These terms are used only to simplify the description, however, and not to limit the interpretation of any embodiment described. As used herein, the terms "determine" and "estimate" may be used interchangeably depending on the particular context of their use, for example, to determine or estimate a position or pose of a vehicle, boundary, obstacle, etc.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method of localizing an autonomous work vehicle within a work region, comprising:

receiving a signal in response to an initialization of the autonomous work vehicle in an arbitrary location within the work region;

in response to the signal, performing a localization process comprising:

generating a localization image of a first part of a scene surrounding the autonomous work vehicle via at least one camera;

generating a check image of a different part of the scene via at least one vision check camera different than the at least one camera;

using the localization image to determine an estimated pose of the autonomous work vehicle within the work region via a three-dimensional point cloud (3DPC) accessible by the autonomous work vehicle;
determining predicted features within the check image based on using the estimated pose and the 3DPC, wherein determining the predicted features comprises predicting locations within the check image at which the predicted features are expected to appear; and
performing a comparison between the predicted features and corresponding features in the check image; and
in response to the comparison satisfying a threshold, causing the autonomous work vehicle to begin autonomous operation within the work region.

2. The method of claim 1, wherein using the localization image to determine the estimated pose comprises:
querying the 3DPC to determine three-dimensional points within the different part of the scene based on the estimated pose;
mapping the three-dimensional points to two-dimensional points within an image plane of the check image; and
generating predicted feature descriptors of the predicted features based on the two-dimensional points.

3. The method of claim 2, wherein performing the comparison between the predicted features and corresponding features in the check image comprises determining the predicted feature descriptors are located within a threshold distance of corresponding feature descriptors of the corresponding features of the check image.

4. The method of claim 3, wherein the predicted feature descriptors characterize first pixel values in a first neighborhood of the predicted features and the corresponding feature descriptors characterize second pixel values in a second neighborhood of the corresponding features.

5. The method of claim 1, wherein the at least one camera comprises three cameras different from the vision check camera.

6. The method of claim 1, wherein the localization process further comprises determining that the comparison does not satisfy the threshold, and in response thereto, using a different set of images as the localization image and the check image, and repeating the localization process.

7. The method of claim 1, wherein the corresponding features comprise appearance descriptors that characterize pixel values in a neighborhood of two-dimensional locations within the check image.

8. The method of claim 1, wherein the comparison comprises determining that a threshold number of the predicted features are within a pixel distance threshold of the corresponding features.

9. An autonomous work vehicle, comprising a controller operable to perform the method of claim 1.

10. An autonomous work vehicle, comprising:
two or more sensors operable to generate two or more respective independent localization data, a first localization data of the two or more independent localization data comprising a first image of a scene surrounding the autonomous work vehicle from a first camera; and
a controller coupled to the two or more sensors and having access to a stored three-dimensional point cloud (3DPC) that represents a work region of the autonomous work vehicle, the controller operable to:
receive a signal to start an autonomous operation mode of the autonomous work vehicle within the work region;
in response to the signal, perform a localization process comprising:
generating the two or more independent localization data;
determining a first pose estimate of a current pose of the autonomous work vehicle via the 3DPC using the first localization data;
determining a second pose estimate of the current pose of the autonomous work vehicle using a second localization data of the two or more independent localization data; and
determining a validated pose when the first pose estimate of the current pose and the second pose estimate of the current pose are separated by less than a threshold amount, wherein operations of the autonomous vehicle are not allowed if the first and second pose estimates of the current pose are separated by more than the threshold amount.

11. The autonomous work vehicle of claim 10, wherein the second localization data comprises an indication that the autonomous work vehicle is in a docking station resulting in the autonomous work vehicle being in a pre-verified pose.

12. The autonomous work vehicle of claim 10, wherein the second localization data comprises a second image of the scene from a second camera, the second image providing the second pose estimate via the 3DPC.

13. The autonomous work vehicle of claim 12, wherein the two or more independent localization data comprise a third image of the scene from a third camera, the third image providing a third pose estimate via the 3DPC, and wherein the localization process further comprises determining three or more comparisons between respective three or more pairs of the first, second, and third pose estimates, the validated pose being determined based on at least one of the three or more pairs being separated by less than the threshold amount.

14. The autonomous work vehicle of claim 13, wherein the validated pose is based on a majority of the three or more pairs being separated by less than the threshold amount.

15. The autonomous work vehicle of claim 10, wherein the controller is further operable to determine that at least one image used to determine the first and second pose estimates is unusable and in response thereto, rotate the autonomous work vehicle and repeat the localization process.

16. The method of claim 1, wherein the at least one camera faces a different direction from the image check camera.

17. The autonomous work vehicle of claim 12, wherein the first and second cameras each face in different directions.

18. The method of claim 1, wherein performing the comparison between the predicted features and corresponding features in the check image comprises determining a deviation between the predicted location in the check image and a measured location in the check image for each predicted feature.

* * * * *